United States Patent [19]
Jutand et al.

[11] Patent Number: 5,335,195
[45] Date of Patent: Aug. 2, 1994

[54] METHOD AND CIRCUIT FOR PROCESSING DIGITAL SIGNALS REPRESENTATIVE OF VECTORS OR TUPLES OF THE SAME DIMENSION AND APPLICATION THEREOF TO SETS HAVING ANY CARDINALITY AND TO VECTORS OR TUPLES OF ANY DIMENSIONS

[75] Inventors: Francis Jutand, Cachan; Anne Lafage, Paris; Emmanuel Boutillon, Chatou, all of France

[73] Assignee: France Telcom, France

[21] Appl. No.: 709,817

[22] Filed: Jun. 4, 1991

[30] Foreign Application Priority Data

Jun. 8, 1990 [FR] France ................. 90 07164

[51] Int. Cl.$^5$ ............................................. G06F 7/52
[52] U.S. Cl. ................................. 364/736; 364/754
[58] Field of Search ....................... 364/736, 754

[56] References Cited
U.S. PATENT DOCUMENTS 3,763,365 10/1973 Seitz ........................ 364/754
4,697,247 9/1987 Grinberg et al. ................ 364/713
4,777,614 10/1988 Ward ............................ 364/754
4,833,635 5/1989 McCanny et al. ........... 364/728.01
5,058,001 10/1991 Li ................................. 364/736
5,170,370 12/1992 Lee et al. ..................... 364/736

FOREIGN PATENT DOCUMENTS 0269995 6/1988 European Pat. Off. .

Primary Examiner—Long T. Nguyen
Attorney, Agent, or Firm—Larson and Taylor

[57] ABSTRACT

A method and circuit for processing digital signals representative of vectors that permits processing between pairs of vectors of sets of vectors for ensuring the meeting in space and time of these vectors. This meeting is effected using parallel processing in a two-dimensional network of cells for processing the component assigned to a dimension of the network, and sequentially by partitioning the sets into sub-sets subjected to processing during a microcycle, during which a sub-set is stored. A sub-set is stored during a macrocycle for the next processing and so on. Vectors can consist of tuples of a data base.

23 Claims, 12 Drawing Sheets

GENERALIZATION TO ANY SIZES OF SETS

GENERALIZATION TO ANY VECTOR DIMENSIONS

USE OF z CIRCUITS IN PARALLEL

1 MACROCYCLE
USE OF W CIRCUITS IN CASCADE

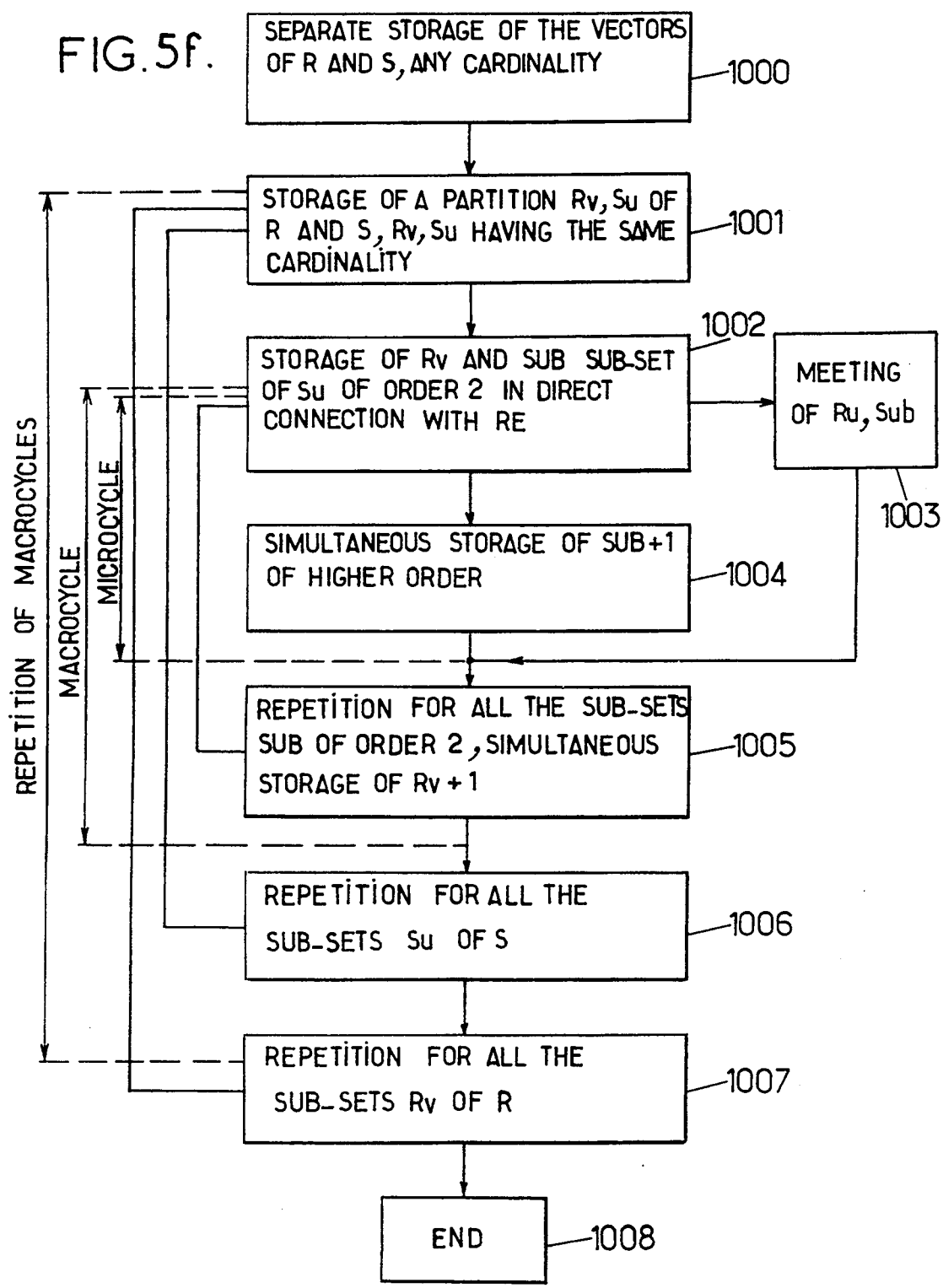

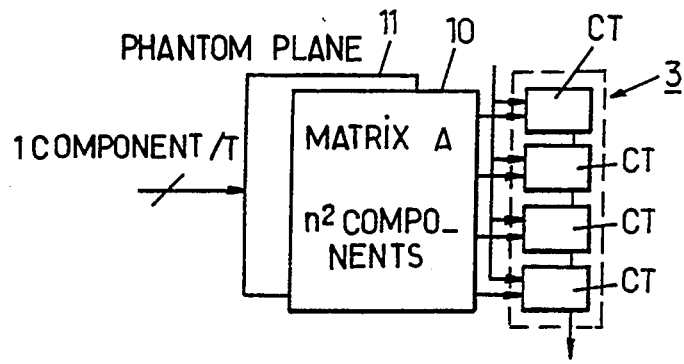
FIG. 6a.
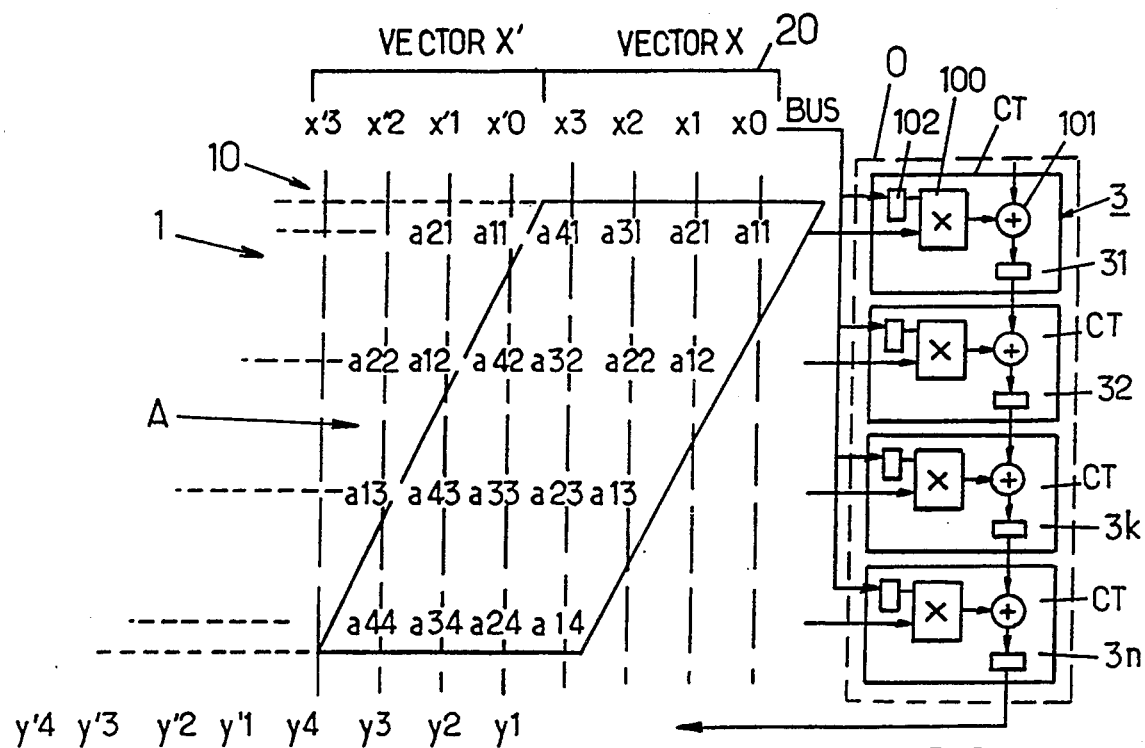
FIG. 6b.
| Y1 = A.X1 | Y2 = A.X2 | ----- | Yn = A.Xn |
MICROCYCLE = nT
MACROCYCLE = n MICROCYCLES = $n^2T$
FIG. 6c.

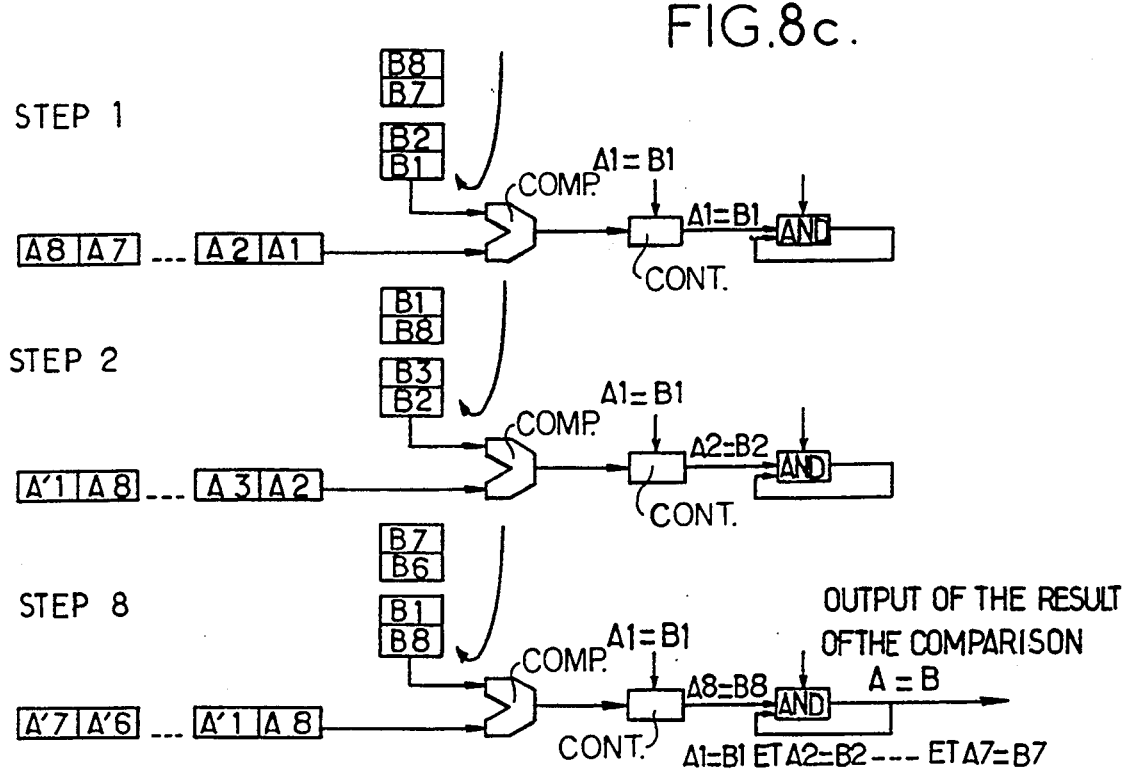
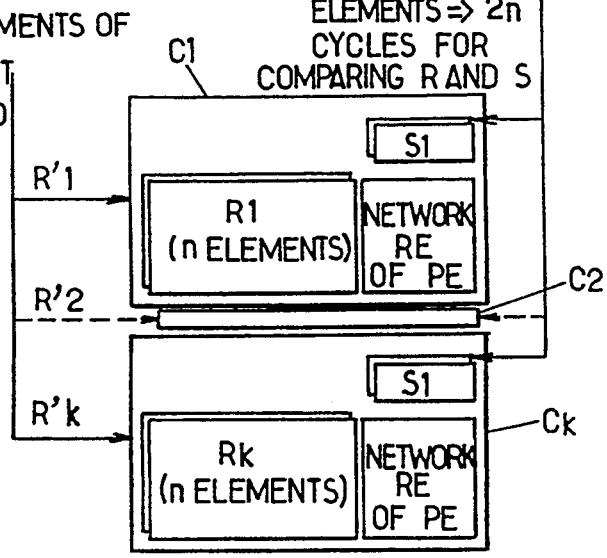

METHOD AND CIRCUIT FOR PROCESSING DIGITAL SIGNALS REPRESENTATIVE OF VECTORS OR TUPLES OF THE SAME DIMENSION AND APPLICATION THEREOF TO SETS HAVING ANY CARDINALITY AND TO VECTORS OR TUPLES OF ANY DIMENSIONS

BACKGROUND OF THE INVENTION

The present invention relates to a method and circuit for processing digital signal representative of vectors or tuples of the same dimension and application thereof to cardinality sets and to vectors or tuples of any dimensions.

In the field of scientific computation, the processing of digital signals representative of vectors or tuples is at the present time based on the use of supercomputers working at a high rate but sequentially on the data to be processed. More generally, vectorial or parallel machines or machines known as "array processors" are used. For using high specialized computing powers implanted in one or more VLSI circuits, systolic type architectures have been proposed for general purpose machines, such as the machine proposed by the Carnegie Mellon Institute in the US under the name WARP and the derived integrated circuit announced by the firm INTEL under the name iWARP.

Among circuits with systolic type architecture there may be further mentioned the neuronal networks which have given rise to monodimensional architectures of the above type (SY Kung).

For implementing data bases of other circuit architectures there have been proposed, in particular, the architecture designated under the name of RAPID which forms the subject of the patent application U.S. 061 642 in the names of P. Fandemay, D. Etiemble and H. He.

The above solutions of the prior art based either on the use of numerous dedicated circuits working in parallel or on the use of super computers requiring a large number of processors and high performance memories lead to very expensive solutions. With the growing increase in the degree of integration, at the present time computing powers corresponding to several milliard specialized operations per second can be currently implanted on a single circuit, by coupling numerous processors in parallel inside a circuit.

These circuits, in order to operate, need to be fed both with operands and/or coefficients. When the coefficients are reduced in number and when the data is re-used a large number of times, as in filtering applications for example, architectures with internal storage base and systolic structures are suitable solutions.

The problem arises on the other hand when the size of the data processing objects to be processed, table or list, increases and when consequently it becomes ineffectual even impossible to store the coefficients or data internally, i.e. in the circuit itself.

If it is then desired to feed the computing processors which can be placed in one of said circuits, it is necessary to increase the communication rate with the external memories by increasing the number of connecting lugs of the circuit and the connection and exchange frequency with these memories.

Apart from said solution, it is possible to use memories hidden in these circuits.

However, the limitations of the corresponding present-day solutions are due to a poor organization of the computations which leads, because of poor balancing, to time "overheads" or overshoots, or to a loss of efficiency in the computing power installed or to an increase of the storage area required, which, in the last resort, often causes under use of the resources.

SUMMARY OF THE INVENTION

The object of the present invention is to overcome the above mentioned drawbacks and particularly to take advantage of the present-day technological potential of processors and RAMs so as to make possible the implantation in integrated circuits of parallel processors with very high computing power, but inexpensive, capable in addition of operating with very high integration density memories (DRAM) but at a medium access speed, of about 80 ns, so as to reduce the resultant overall costs.

The method of processing digital signals representative of vectors or tuples having the same dimension p, forming the object of the present invention, this processing being carried out between pairs of vectors Xi with components $\{xki\}$ of a first set of vectors R and of vectors Yi with components $\{yki\}$ of a second set of vectors S, this processing consisting in causing pairs of vectors Xi, Yi to meet for placing in presence components of the same order $k\{xki\};\{yki\}$ and effecting computation on these components, is remarkable in that it consists in attributing to one of the sets of vectors R the quality of spatial meeting data, corresponding to a succession in time of spatial meeting data vectors Rk formed either by the vectors Xi or their components $\{xki\}$ or by an arrangement of these vectors Xi or their components. To the other set of vectors S is attributed the quality of input data, this input data being formed from at least one vector Yi of the other set of vectors S or by their corresponding components $\{yki\}$. A spatial and time meeting of input data and spatial meeting data is carried out using parallel processing, such parallel processing being organized in a two-dimensional network. To one of the dimensions x of this two-dimensional network is assigned the succession in time of spatial meeting data vectors Rk and to the other dimension y of this two-dimensional network is assigned the input data formed by the vector or vectors Yi or by its components $\{yki\}$.

The circuit for processing digital signals representative of vectors or tuples of the same dimension p, in accordance with the above method, is remarkable in that it comprises, on the one hand, first means for storing one of the sets of vectors R in the form of spatial meeting data, this stored spatial meeting data being able to be read in a succession in time of spatial meeting data vectors Rk formed either by vectors Xi or their components $\{xki\}$ or an arrangement of these vectors or their components and, on the other hand, second means for storing the other set of vectors S in the form of input data, this input data being formed from at least one vector Yi of the other set S of vectors or of their corresponding components $\{yki\}$. Computing means are included for providing a first meeting in space and time of the input data and the spatial meeting data using parallel processing. The computation means are formed of a two-dimensional network of cells for processing the components $\{xki\}$ respectively $\{xki\}$, the succession in time of spatial meeting data vectors being assigned to one of the dimensions x of the two-dimensional network and the input data being assigned to the other dimension y of this network.

The method and circuit according to the invention may be used in all applications using large data structures such as vectorial computation, matrix computation and finally the data bases in which data is used having a minimum of regularity or stationarity allowing the introduction of the re-use in time of such data.

BRIEF DESCRIPTION OF THE DRAWINGS

The method and circuit according to the invention will be better understood from the following description with reference to the accompanying drawings in which:

FIG. 1c shows the computing phase of the embodiment shown in FIG. 1a;

FIG. 5a shows a generalization of the method of the invention such as shown in FIG. 1a;

FIG. 5f shows a timing chart relative to the object of the present invention for processing sets R, S of vectors or tuples of any different cardinality;

FIG. 6a shows a one-dimensional network of an embodiment of the present invention;

FIG. 6b shows a detailed version of FIG. 6a;

FIG. 6c shows the computing phase of the embodiment shown in FIGS. 6a and 6b.

FIG. 8b represents a non limitative detail of construction of an elementary processor used in the configuration of the circuit such as shown in FIG. 8a;

FIG. 8c represents, in its steps 1), 2) and 3), the operating mode of an elementary processor such as shown in FIG. 8b;

FIG. 9 represents a digital data processing system using a plurality of circuits according to the invention, these circuits operating in parallel so as to increase the cardinality of the sets of vectors or tuples processed without increasing the rate of transmission of data between an external mass memory outside the circuit and the input data properly speaking.

DESCRIPTION OF THE PREFERRED EMBODIMENTS

The method of the present invention will be described first of all in relation with FIGS. 1a–1c. It will however be noted that in the whole of the following description, the same references relative to the different figures represent the same elements.

Figure 1A:
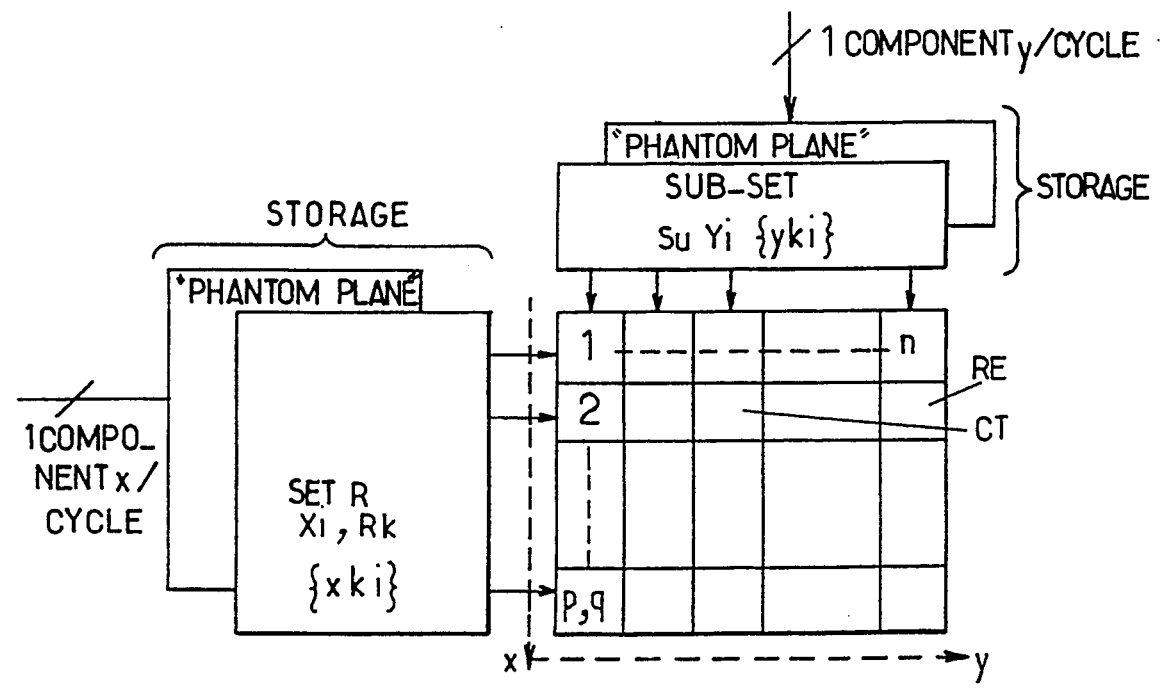
FIG. 1a shows a two-dimensional network of an embodiment of the present invention.

According to the invention, the method of processing digital signals representative of vectors or tuples having the same dimension p, the processing being carried out between pairs of vectors $X_i$ with components $\{x_{ki}\}$ of a first set of vectors R and of vectors $Y_i$ with component $\{y_{ki}\}$ of a second set of vectors S, such processing consisting in causing pairs of vectors $X_i$, $Y_i$ to meet so as to place components of the same order $k\{x_{ki}\};\{y_{ki}\}$ in presence and effecting computation on these components consists, as shown in FIG. 1a, in attributing to one of the sets of vectors R the quality of spatial meeting data corresponding to a succession in time of spatial meeting data vectors, these vectors being referenced $R_k$. The spatial meeting data vectors are formed either by the vectors $X_i$ or by their components $\{x_{ki}\}$ or by an arrangement of said vectors $X_i$ or of their components.

To the other sub-set of vectors S is attributed the quality of input data, this input data being formed from at least one vector $Y_i$ of the other set of vectors S or of a given sub-set $S_u$, the input data being possibly formed from the corresponding components $\{y_{ki}\}$ of said vectors $Y_i$.

The method of the invention then consists in causing a meeting in space and time between the input data and the spatial meeting data using parallel processing. The parallel processing is organized, as shown in FIG. 1a, as a two-dimensional network reference RE of cells for processing the components $\{x_{ki}\}$ respectively $\{y_{ki}\}$.

As is further shown in FIG. 1a to one of the dimensions x of the two-dimensional network RE is assigned the succession in time of spatial meeting data vectors $R_k$ and to the other dimension y of the two-dimensional network is then assigned the input data formed by at least one vector $Y_i$ or by its corresponding components $\{y_{ki}\}$.

In the method of the invention, the operation considered is the meeting of two sets referenced R, S of vectors having the same dimension. By meeting of two sets of vectors is meant that each of the vectors of set R must meet all the vectors of set S. Computation is carried out on the same order components of the two vectors taken two by two and the result of the meeting finally depends on all the intermediate results obtained on said components.

According to the method of the invention, parallel processing of the spatial meeting data and of the input data is carried out in a two-dimensional network referenced RE of cells for processing the components of said vectors. Each processing cell referenced CT thus makes possible the meeting of a plurality of vectors of set R and of a plurality of vectors of set S. Each processing cell carries out the computation component by component.

It will be noted that, advantageously, the vectors of set R or of set S are stored separately, that further the corresponding vectors of set R and of set S being processed are stored so as to be in direct connection with the two-dimensional network RE whereas the same sets R and S comprising other vectors, not yet subjected to processing, may advantageously be stored during the processing in progress of said corresponding vectors, so as to prepare the following computation context.

Figure 1B:
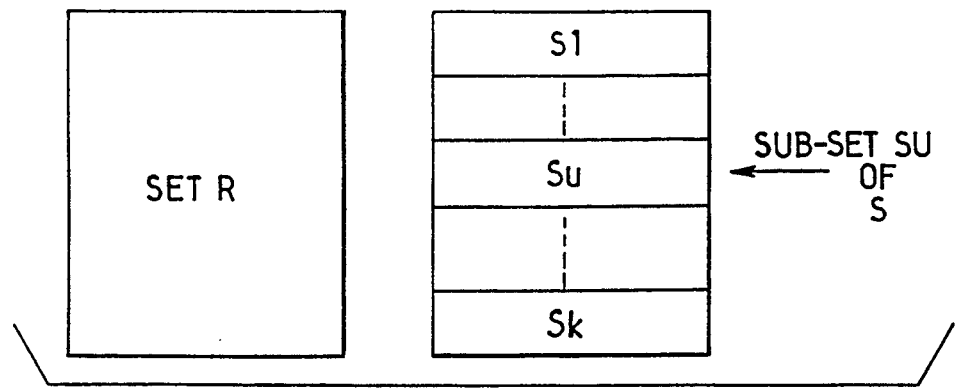
FIG. 1b shows sets of vectors for use with the present invention.

To this end, set S, as is shown in FIG. 1b, may be partitioned into several sub-sets of the same size, each sub-set being referenced Su.

After an initialization phase, set R and sub-set S are considered as loaded and stored for forming the vectors subjected to said processing.

Figure 1C:
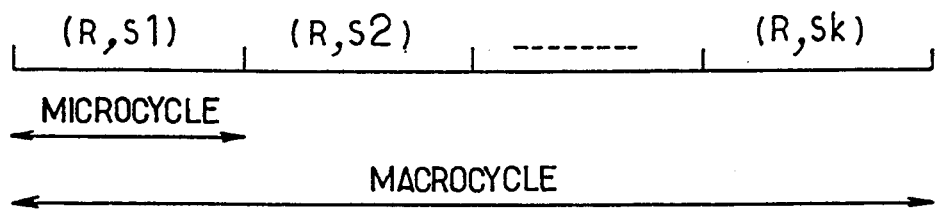

As is shown in FIG. 1c, the computing phase causing the meeting of sets R and S is then broken down into a succession of equal periods called microcycles. A microcycle corresponds to the meeting of a sub-set Su of S with the set R and parallel loading of the sub-set Su+1 so as to form the following context of the next microcycle. At the end of processing of the sub-set Su, the context of the next microcycle is ready.

As is shown in FIG. 1c, each microcycle then corresponds to the meeting of the set R of vectors and of a sub-set Su considered.

Similarly, in accordance with the method of the invention, a period called macrocycle is defined which corresponds to the meeting of all the sub-sets Su of S, with u varying from 1 to K for example, with set R and the simultaneous loading of a new set R' and of a first sub-set S'i of another set of input data vectors S'. Similarly, at the end of a macrocycle, the context of the next macrocycle is ready.

In accordance with the method of the invention, it is thus possible to define a processing period hierarchy. Two sets R and S of very high cardinality or size may thus be divided into sub-sets Rv and Su of identical size but smaller. The macrocycle then corresponds to the meeting of two sub-sets Rv and Su. Each sub-set Su must be partitioned into sub-sets Sub and the meeting between vectors of sub-sets Sub and Rv corresponds to a microcycle. The meeting of sets R and S thus requires a succession of macrocycles.

It will be noted that the method of the invention is particularly advantageous for this method provides processing of vectors or tuples in which the size in number of vectors of sets R and S does not condition that of the corresponding storage units. Furthermore, in accordance with the method of the invention, the sizes of sets R and S may be different. It is of course sufficient to form, in each of said sets R and S, sub-sets Rv and Su having the same size or cardinality.

In accordance with an advantageous aspect of the method of the invention, the input data is formed from n vectors Yi with i belonging to [1,n]. To the other dimension y of the two-dimensional network RE of processing cells are assigned the components $\{yki\}$ forming an input data vector. The two-dimensional network of processing cells then comprises n processing cells according to the other said dimension y.

Similarly, each spatial meeting data vector Rk may be formed by a vector Xi of dimension p. In this case, to the dimension x of the two-dimensional network RE of processing cells referenced CT are assigned the components $\{xki\}$ forming the spatial meeting data vector Rk. The two-dimensional processing network RE comprises p processing cells CT along said dimension.

In a variant of the method of the invention, each spatial meeting data vector Rk may be formed by an arrangement of the components $\{xki\}$ of a plurality of q vectors Xi, with i belonging to [1,q]. The succession in time of spatial meeting data Rk is then formed by the components $\{xki\}$ of vectors Xi In this case, the two-dimensional network RE comprises, along dimension x, q processing cells.

In so far as the organization of the two-dimensional network RE is concerned, it will be noted that in the case where it comprises n.p processing cells CT arranged in p lines and n columns, in a first non limitative variant, the method of the invention may consist in conducting the meeting between two vectors Xi, Yi in a column of said processing cells. Each processing cell CT then delivers to the processing cell of immediately higher order of the same column an intermediate processing result. The processing cell of order p of each column then delivers a final processing result for a given pair of vectors Xi, Yi.

In another variant of the method of the invention, when the two-dimensional network RE comprises n.q processing cells arranged in q lines and n columns, the meeting between two vectors Xi, Yi may be conducted locally at the level of a processing cell by processing the p corresponding components $\{xki\},\{yki\}$.

The two embodiments and implementations of the meeting between vectors described above does not prejudice different embodiments. Among such embodiments may be included any parallel presentation-sequential distribution or reciprocally.

More generally, it will be noted that the data able to be processed according to the invention is data organized in vector tables. The size of the tables and the dimension of the vectors concerned may be very high.

Figure 2A:
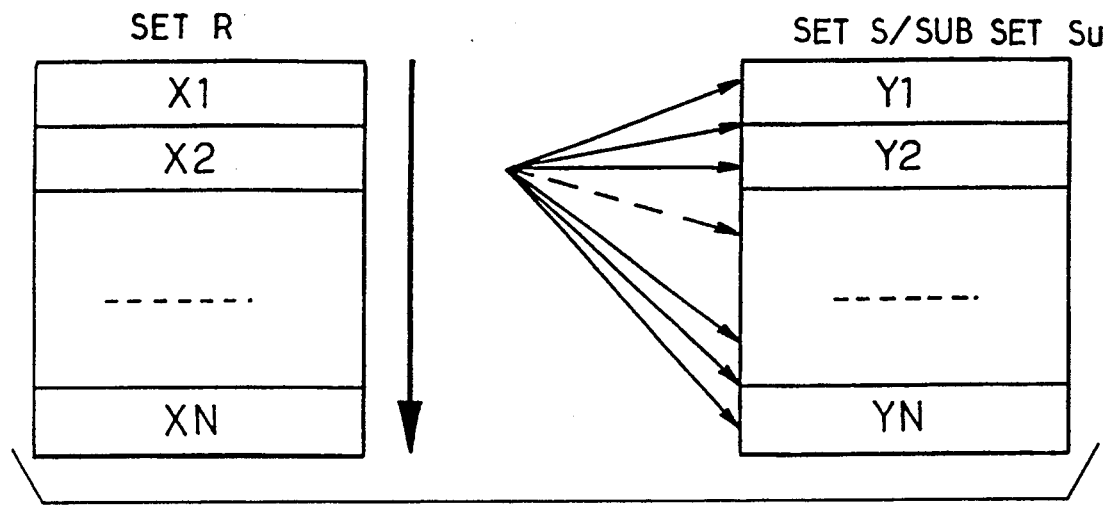
FIG. 2a illustrates the meeting procedure between vectors of a first set R and of a second set S
Figure 2B:
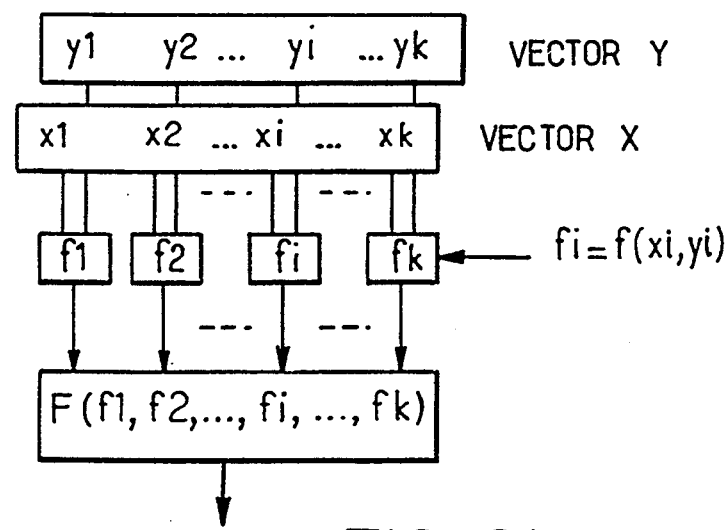
FIG. 2b illustrates a meeting via function f of vector x and vector y.

In so far as the operations carried out by the processing network RE is concerned, it will be recalled, as shown in FIGS. 2a and 2b that the meeting of two sets or tables of vectors of the same dimension results in the meeting of each of the vectors of a set with all the vectors of the other set. This meeting thus results first of all in the computation of a function over the pairs of components of the same rank k, the result of the meeting depending on the results obtained on said pairs of components. In FIGS. 2a and 2b, computation of the function mentioned is referenced f1, f2, fi, fk.

It will be noted that the method of the invention makes use of computation parallelism both in the spatial and time dimensions so as to increase the rate of re-use of the information introduced into the two-dimensional network RE. The terms "spatial" and "time" are borrowed initially from applications where one of the data sets is inherent to the problem. This data may thus be called the data of the problem, such data being formed for example by a matrix of coefficients in a matrix computation application. The other set is then formed by the data to be processed which will thus be called input data.

Thus the term spatial parallelism means that an input vector meets in parallel several spatial meeting data vectors.

The term time parallelism means that several input data are processed in parallel.

For the sake of convenience, the use of such terms are extended to other applications requiring two sets of data and in which neither data particular to the problem nor input data are distinguished a priori. It is however advantageous to thus qualify said data so as to polarize the corresponding application. This is in particular the case of applications of the method of the invention relative to the data base.

The method of the invention also uses balancing of the above defined space and time working zones, so as to obtain an internal storage minimum in order to reserve the maximum of integrated circuit area available for computation properly speaking and for reducing the pass-band of the flow of data transmitted or received via the memories storing the external data.

In practice, the two above mentioned characteristics result, on the one hand, in a particular organization of the computation for using the two types of parallelism, said computations being sequenced as described above in microcycles and macrocycles and, on the other hand, by a family of circuits allowing implantation of the organization of said computations. Similarly, the size or capacity of the units required for storing the sets of vectors R or sub-sets Su of set S is fixed by balancing, which thus makes it possible to have a minimum pass-band with the external memories without under-using the computing power integrated in the circuit according to the invention.

A more detailed description of a circuit for processing digital signals representative of vectors or tuples having the same dimension p according to the invention will now be given in connection with FIGS. 3 and 4.

Figure 3:
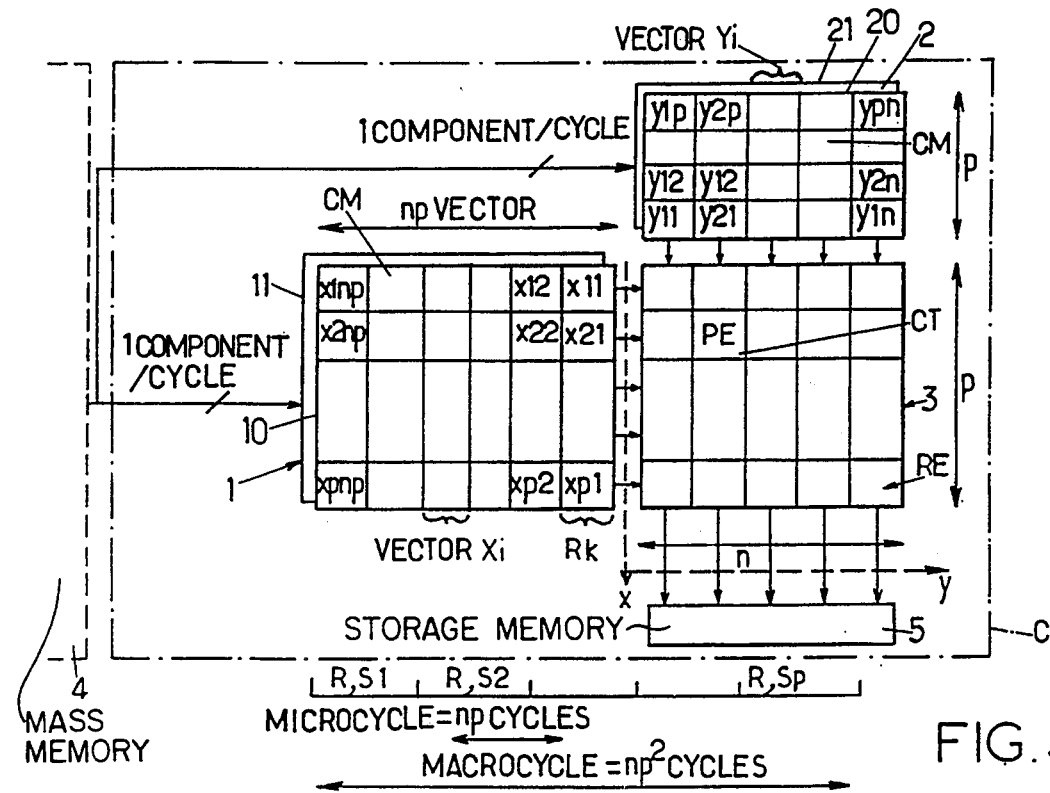
FIG. 3 Shows a first advantageous non limitative embodiment of a circuit according to the invention of the parallel sequential-distribution presentation type.
Figure 4:
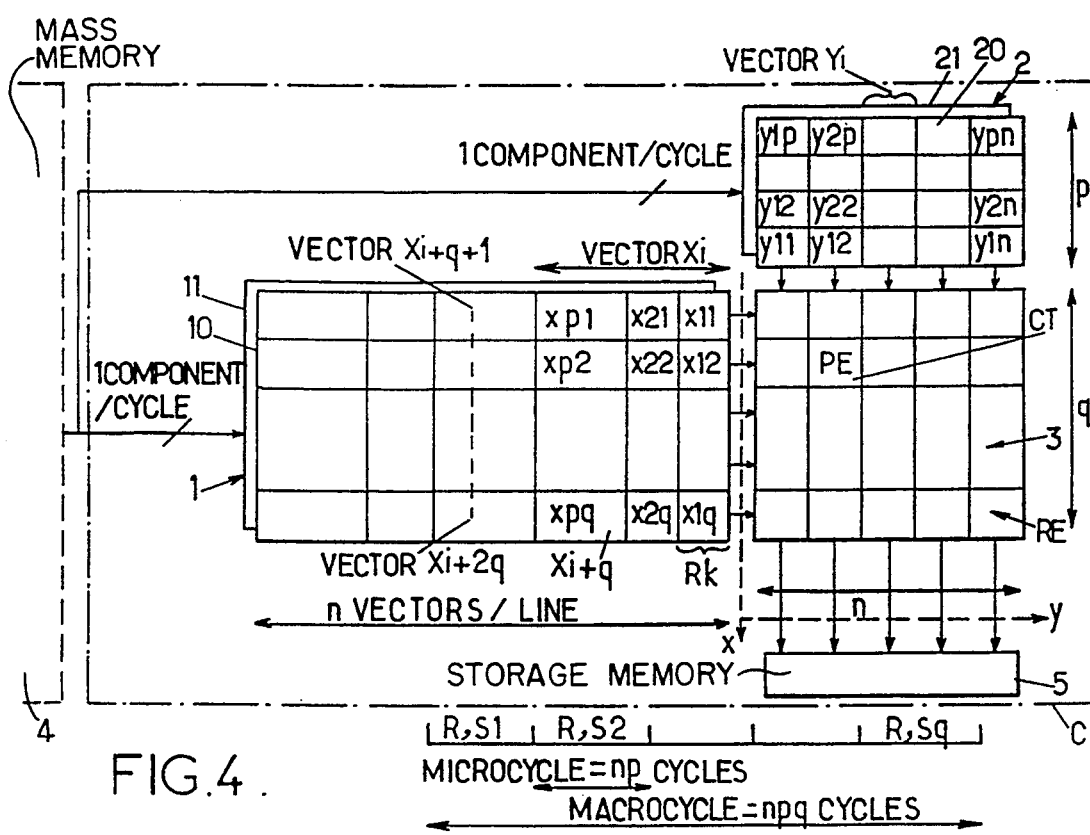
FIG. 4 shows a second advantageous non limitative embodiment of a circuit according to the invention of the parallel parallel-distribution presentation type.

In FIGS. 3 and 4, the circuit of the invention, referenced C and whose perimeter is defined by a chain-dotted line, comprises a first unit 1 for storing one of the sets of vectors R in the form of spatial meeting data. This spatial meeting data is stored so as to be read out in a succession in time of spatial meeting data vectors Rk. These vectors are formed either by the vectors Xi or their components $\{xki\}$ or by an arrangement of these vectors or of their components as will be described subsequently.

In addition, the circuit of the present invention comprises a second unit 2 for storing the other set of vectors S in the form of input data. This input data is formed from at least one vector Yi of the other set S of vectors or of their corresponding components $\{yki\}$. It will in fact be understood that the input data, as was described above, may be formed by any sub-set Su of set S.

Furthermore, as is shown in FIGS. 3 and 4 mentioned above, an active computing unit 3 effects a meeting in space and time of the input data and of the spatial meeting data using parallel processing under the above defined conditions. It will be noted that the active computing unit 3 is formed as a two-dimensional network RE of cells for processing the components $\{xki\}$ or respectively $\{yki\}$, the succession of spatial meeting data vectors Rk being assigned to one of the dimensions x of the two-dimensional network and the input data being assigned on the other hand to the other dimension y of this two-dimensional network.

As is further shown in FIGS. 3 and 4, the first 1 and second 2 storage units each comprise a working memory plane referenced 10 and 20 respectively, in which a corresponding sub-set of vectors is stored during processing. The working memory plane 10, 20 is directly interconnected by a parallel interconnection to the processing cells CT of the two-dimensional network according to the assignment dimension x respectively y of the corresponding data.

The first 1 and second 2 storage units also comprise a phantom memory plane referenced 11 and 21 respectively, interconnected, on the one hand, to a mass memory 4 and, on the other hand, respectively to the working memory plane 10, 20. It will be noted that the phantom memory plane 11, 21 acts as an auxiliary memory of the working memory plane for a corresponding sub-set of vectors of higher order during processing of the corresponding sub-set of vectors. Thus, the working memory planes and phantom memory planes 10, 11 respectively 20, 21 are identical and may successively play the role of working planes respectively phantom plane by simple switching. The mass memory 40 is shown with dotted lines and is therefore external to the perimeter of circuit C shown in FIGS. 3 and 4.

During operation, the circuit of the present invention as shown in FIG. 3 or 4 is such that the size of the memory planes of set S, in which the sub-sets Su is in fact loaded, in particular the corresponding phantom memory plane 21 may be completely loaded during a microcycle at a rate of one vector component per clock cycle, whereas the size of the memory planes of set R, working memory planes 10 respectively phantom memory plane 11, is such that the phantom memory plane may be completely loaded during a macrocycle at the same rate of one vector component per clock cycle.

Furthermore, the relation between the size of the active computing unit 3 in the number of processing cells CT and that of the memory planes is such that the latter has never to wait until the context of a microcycle or a macrocycle is considered as ready.

It will be further noted that in so far as the active computing unit 3 is concerned, it comprises a plurality of elementary processors referenced PE forming in fact the processing cells CT. The two-dimensional network RE is then organized as a rectangular area for ensuring the meeting of a plurality of vectors of the first set R and a plurality of vectors of the second set S.

In so far as the organization of the working memory plane 20 and of the phantom memory plane 21 of the second storage unit 2 is concerned, it will be noted that the latter permitting the storage of a sub-set of vectors Su of the other set of vectors S is provided so as to allow storage of the components $\{yki\}$ of the corresponding vectors Yi in storage cells referenced CM using line and column addressing. Each vector Yi is then stored in a column shown in FIGS. 3 and 4. The working memory plane 20 and the phantom memory plane 21 then comprise n columns for storing n vectors Yi, each line comprising n components $\{yki\}$ forming the above mentioned input data.

A more detailed description of two non limitative embodiments of a circuit according to the invention will be given in connection with FIGS. 3 and 4 respectively, relatively to a first configuration of parallel presentation-sequential distribution type and to a second configuration of parallel presentation-parallel distribution type.

It will be noted that the designations of sequential presentation-parallel distribution concern respectively the sequential presentation of the spatial meeting data formed by the above mentioned vectors Rk, these vectors being introduced sequentially at the rate of a vector per unit of time corresponding to one or more clock pulses sequencing the circuit of the invention. Of course, the clock circuits delivering the corresponding clock signals are not shown in FIGS. 3 and 4.

Similarly, the parallel presentation-parallel distribution designations refer to a parallel presentation of vectors Rk forming the spatial meeting data, these vectors being on the contrary, in this second embodiment, introduced in parallel into the active processing unit 3, as will be described subsequently in the description.

In the two embodiments, it will be noted that the parallel distribution designation relates to the distribution of the computation results, these results being distributed in parallel by the elementary processors PE forming the last line x of the previously described two-dimensional network RE.

The first embodiment according to the first configuration of sequential presentation-parallel distribution type will be described first of all in relation with FIG. 3.

In said configuration, the two-dimensional network RE comprises n.p elementary processors arranged in p lines and n columns. Each storage cell CM of the first line of the working memory plane 20 is interconnected to all the processing cells CT, and to the corresponding elementary processor PE via a BUS. The working memory plane 10, in which the spatial meeting data vectors Rk are stored, is organized so as to provide storage of the components {xki} of the corresponding vectors Xi in the storage cells with line and column addressing. Each vector Xi is stored in a column, a spatial meeting data vector thus corresponding to a vector Xi. Each storage cell CM of the first column of the working memory plane 10 is interconnected to all the processing cells CT and to the corresponding elementary processor PE via a BUS.

In the first configuration such as shown in FIG. 3, the working memory plane 10 then comprises n.p columns of storage cells CM for storing the n.p vectors Xi forming the successive spatial meeting data vectors Rk.

Thus, in the first configuration such as shown in FIG. 3, the working memory plane 20 and of course the phantom plane 21 contain n vectors Yi relative respectively to a sub-set Su, Su+1 of set S, the vectors Yi being of dimension p and arranged vertically.

The memory plane of set R contains n.p vectors Xi of dimension p.

The operation performed by the circuit such as shown in FIG. 3 is the meeting of two sets of n.p vectors.

The active processing unit 3 formed of n.p elementary processors receives successively the p lines of the memory plane S. At time T1, the first line is loaded into the first row of the elementary processors, then the second line into the second row of elementary processors and so on until the last one. When the first row of elementary processors is loaded, it may then receive the first component x11 of the vector X1. Similarly, when the second row of elementary processors is loaded, it may receive the second component x21 of vector X1, while the first row receives the first component x12 of vector X2 and so on.

The meeting between two vectors Xi and Yi, or else Yj with i different from j, consequently takes place in a column of order y of elementary processors PE, such as shown in FIG. 3. At each cycle, clock cycle, an elementary processor delivers its result to the elementary processor which succeeds it in the same column in the order of the increasing x's. The $p^{th}$ elementary processor of a column thus delivers a result per cycle.

In the case where the working planes 10–20 and the corresponding phantom planes 21–11 are loaded with corresponding vector components at the rate of one component {xki} {yki} respectively per clock cycle, for reloading the phantom plane S, namely the phantom plane 21, at the rate of one component per cycle, n.p cycles are required. To this end, memory plane R, namely the working plane 10 and the phantom plane 11, may advantageously be loaded and contain n.p vectors Rk. In n.p cycles the n vectors Yi of the first sub-set S1 meet the n.p vectors of set R. Concurrently, the phantom plane S, 21, receives the n following vectors forming the sub-set Su+1, or S2.

According to the prior designation, a microcycle is formed by n.p cycles. During a microcycle, n vectors of set S, more particularly of sub-set Su, meet the n.p vectors of set R and, concurrently, a new sub-set Su+1 of S is loaded into the phantom plane 21 of the second storage unit 2.

At time Tnp+1, the first row or line of elementary processors PE of the two-dimensional network RE thus receives the first line of the working memory plane 20 containing the sub-set Su+1 and thus begins the second microcycle.

To re-load the phantom plane 11 containing the spatial meeting data vectors Rk, $n.p^2$ cycles are required. This time corresponds to the processing of p sub-sets of S, namely to a set of n.p vectors. Thus, a macrocycle is defined comprising $n.p^2$ cycles during which the meeting of two sets of n.p vectors has thus been effected and concurrently a new set R' of vectors Xi loaded forming spatial meeting data vectors Rk.

It will be noted that FIG. 3 shows the distribution of the corresponding cycles, microcycles and macrocycles.

In the first configuration of the circuit of the present invention such as shown in FIG. 3, it will in fact be noted that only the phantom plane 21 may be implanted adjacent the two-dimensional network RE of elementary processors PE, the working memory plane 20 then being distributed in the form of registers, which are implanted directly in the two-dimensional network RE itself or in the vicinity thereof.

A more detailed description of the second configuration of parallel presentation-parallel distribution type will now be given in connection with FIG. 4.

In said configuration, the two-dimensional network RE comprises n.q elementary processors PE arranged in q lines and n columns. The interconnection of the processing cells CTs CT and of the corresponding elementary processors PE to the storage cells of the working memory planes 10 and 20 is provided in the same way as in the first configuration. The working memory plane 10 in which the spatial meeting data vectors Rk are stored is then organized so as to provide storage of the components {xki} of the corresponding vectors Xi in storage cells CM with line and column addressing.

In the second configuration such as shown in FIG. 4, each vector Xi is stored on a line, each line comprising n vectors Xi. Each spatial meeting data vector Rk is then formed from components {xki} of the same order k of q vectors stored in q adjacent lines.

As shown in FIG. 4, the working memory plane 10 comprises, stored in the q adjacent lines, the vectors Xi to Xi+q, then following these latter the vectors Xi+q+1 to Xi+2q, and so on.

In the second configuration such as shown in FIG. 4, the working memory plane 20 relative to set S contains, as in the first configuration described in connection with FIG. 3, n vectors Yi of dimension p stored per column.

The working memory plane 10 and the phantom plane 11 relative to set R contain n.q vectors Xi of the same dimension organized in q lines of n vectors.

The operation performed by the active processing unit 3 is the meeting of two sets of n.q vectors. The n.q elementary processors PE receive at each cycle a line of the memory plane S and a column of the memory plane R, i.e. the spatial meeting data vectors Rk. Preferably, the organization of the memory planes, as shown in FIG. 4, is such that at each cycle an elementary processor PE receives two components {xki} and {yki} of the same rank. The meeting of two vectors Xi and Yi consequently takes place locally in an elementary processor PE with a given address x,y. At the end of p cycles, the elementary processor PE with said address x,y may then deliver a result via a common BUS.

As in the case of the first configuration, a microcycle may be defined of n.p cycles during which the n vectors of a sub-set of S meet the n.q vectors of set R, the phantom plane S, i.e. the phantom plane 21, receiving a new sub-set Su+1 of set S. In the second configuration such as shown in FIG. 4, during a microcycle the working memory plane 20 relative to set S must be read n times.

The corresponding macrocycle is then equal to q microcycles, as shown in FIG. 4, during which the q sub-sets Su+q of set S are compared with set R, concurrently with loading and storage of a new set R' in the phantom plane 11 of the first storage unit 1.

In the two configurations proposed, such as shown in FIGS. 3 and 4, the circuit of the present invention provides, during a macrocycle, the meeting of two sets R and S of identical size and cardinality in the number of vectors. However, the circuit of the present invention makes it possible for two sets of any size to meet by a succession of macrocycles.

Of course, the operation of the circuit of the present invention is not limited to the embodiments such as shown in FIGS. 3 and 4.

In particular, it is possible to generalize and widen the function of the circuit of the present invention in the case when, instead of loading and storing a component per cycle, clock cycle, of the storage units, the first storage unit 1 and the second storage unit 2, as well as the transmission of the spatial meeting data vectors Rk or of input data vectors, take place at the rate of Nx components per cycle, respectively Ny components per cycle.

Such generalization will now be described in connection with FIGS. 5a to 5e, for giving a more adapted description of the circuit of the present invention.

For a number Ny of components per cycle which feed the memory plane relative to set S, the phantom plane 21 relative to set S may be loaded during a microcycle of n.p/Ny clock cycles.

In the number of clock cycles, a microcycle is defined by the relation:

$$\frac{n \cdot p}{Ny}$$

The duration of the microcycle thus defined fixes the depth along y of the memory plane R and the overall size of the memory plane R is equal to:

$p \cdot \frac{n \cdot p}{Ny}$ in the first configuration and to $q \cdot \frac{n \cdot p}{Ny}$ in the second configuration.

For a number of inputs and storage Ny of components per cycle of the memory plane relative to set R, the phantom plane 11 relative to set R may be loaded during a macrocycle equal to:

$p \cdot \frac{n \cdot p}{Ny} \cdot \frac{1}{Nx}$ in the first configuration and to $q \cdot \frac{n \cdot p}{Ny} \cdot \frac{1}{Nx}$ in the second configuration.

For a given number of elementary processors PE, namely n.p in the first configuration such as shown in FIG. 3, and n.q in the second configuration such as shown in FIG. 4, the increase of the passband reduces the size of the memory planes used.

Thus it will be understood that generally the circuit C of the invention advantageously has a size Tr in the number of storage cells (CM) of the phantom plane (11) or of the working memory plane (11) relative to set R verifying the relation:

$$Tr = \frac{\mathcal{N} \cdot p}{Ny}$$

in which:

$\mathcal{N}$ designates the number of elementary processors PE forming the two-dimensional network RE, p designates the dimension of the vectors, Ny designates the rate of storage in said memory planes in the number of components of the vectors per clock cycle.

It will of course be understood that the circuit of the present invention such as shown in FIGS. 3 and 4 may be used to cause the meeting of sets of vectors or tuples of any size, a single circuit being used.

In fact, the circuit such as shown above is capable, during a macrocycle, of causing the meeting of n.q vectors of R and n.q vectors of S. For sets R and S with cardinality N and N', i.e. comprising N and N' vectors, it is then possible to form sub-sets of n.q vectors in each of said sets. The numbers of sub-sets in sets R and S are respectively N/n.q and N'/n.q. The meeting of all the vectors of sets R and S takes place when each sub-set of S meets all the sub-sets of set R and, consequently, the number of macrocycles required for such meeting is:

$$\frac{N \cdot N'}{(n \cdot q)^2}$$

A non limitative implementation of sequential type of the method of the invention for causing the meeting of two sets R, S of any cardinality is shown in FIG. 5f.

In this figure:

1000 indicates a step for the separate storage of the vectors R and S, sets of any cardinality,

1001 indicates a step for storing a partition Rv, Su of R and S, Rv and Su being sub-sets having the same cardinality,

1002 indicates a step for storing Rv and Sub, Sub being the sub-set of Su and sub-set of order 2 of S in direct connection with the two-dimensional network RE in the working memory planes 10, respectively 20, 1003 indicates a step for space and time meeting of the sub-sets Rv and Sub during a microcycle, 1004 indicates a step for the simultaneous storage during the microcycle of the sub-set Sub+1 of higher rank in the phantom plane 21, 1005 indicates a step for repeating 1002, 1003, 1004 for all the sub-sets of order 2 Sub of S, during a macrocycle and simultaneous storage of Rv+1 in the phantom plane 11, 1006 indicates a repetition step for all the sub-sets Su of S, 1007 indicates a repetition step for all the sub-sets Rv of R, 1008 indicates an end step.

Similarly, the circuit such as shown in FIGS. 3 and 4, in accordance with the present invention, may be used for causing the meeting of vectors of any dimension called hereafter macro-vectors.

A circuit causes two sets of vectors of dimension p to meet. For a dimension p of the vectors of sets R and S, with P>p, each vector is then divided into P/p sub vectors of dimension p, the sub vectors of dimension <p being possibly completed by components having an arbitrary value, zero for example. During a macrocycle, the circuit of the present invention such as shown in FIG. 3 or 4 causes the meeting of n.p, respectively n.q sub vectors of R and S. Consequently, P/p macrocycles are required for processing the whole of these vectors. The partial results obtained on the sub vectors must then be re-injected into the elementary processors PE at the beginning of each macrocycle. The storage of the partial results, i.e. the results relative to each macrocycle, may then take place inside the circuit itself in a storage memory referenced 5, internal to circuit C, the storage memory 5 being shown with continuous lines in FIGS. 3 and 4.

It will be finally noted that the use of several parallel or cascaded circuits increases the processing rate, as will be described schematically in connection with FIGS. 5d and 5e.

Figure 5A:
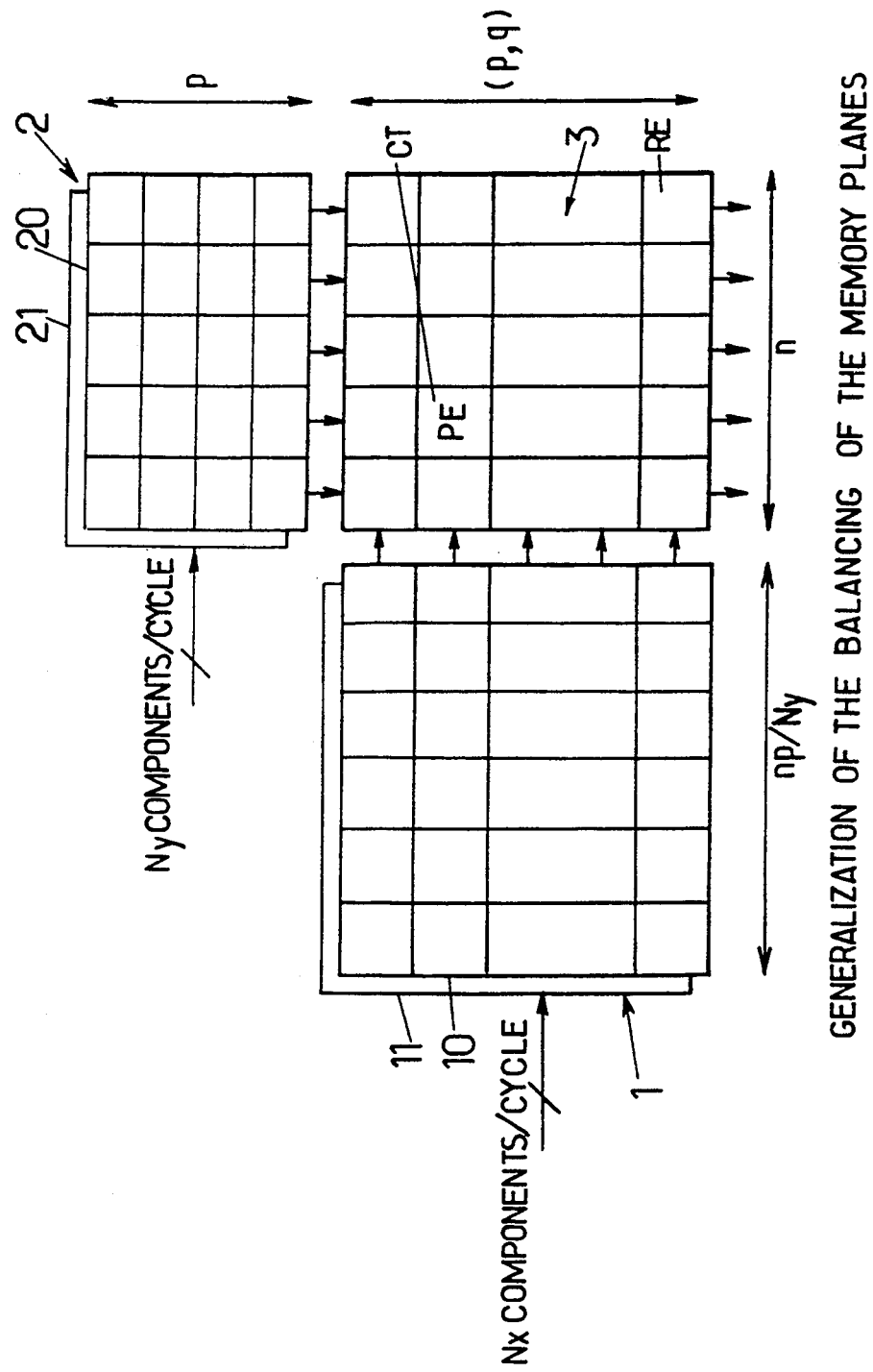
Figure 5B:
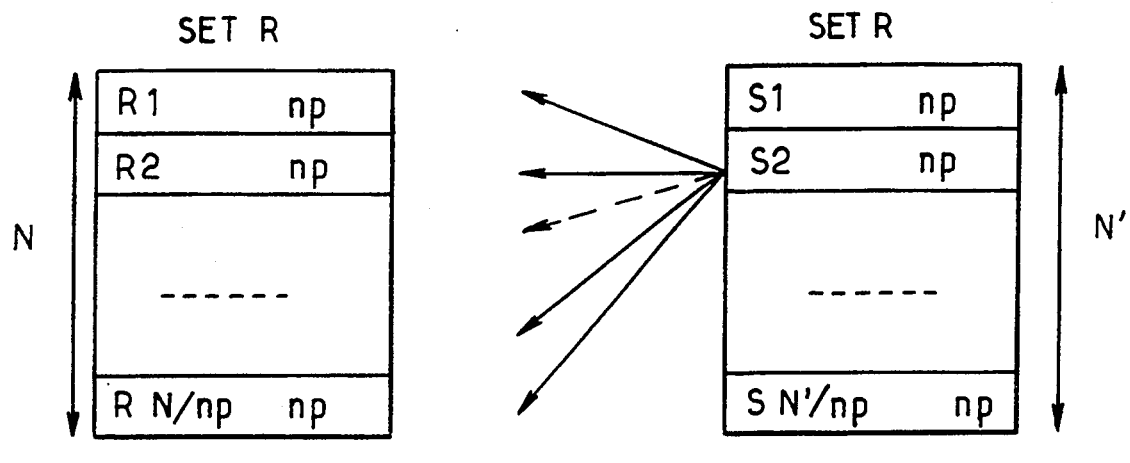
FIG. 5b is a diagram illustrating a generalization of the method of the invention to sets of vectors having any cardinality.
Figure 5C:
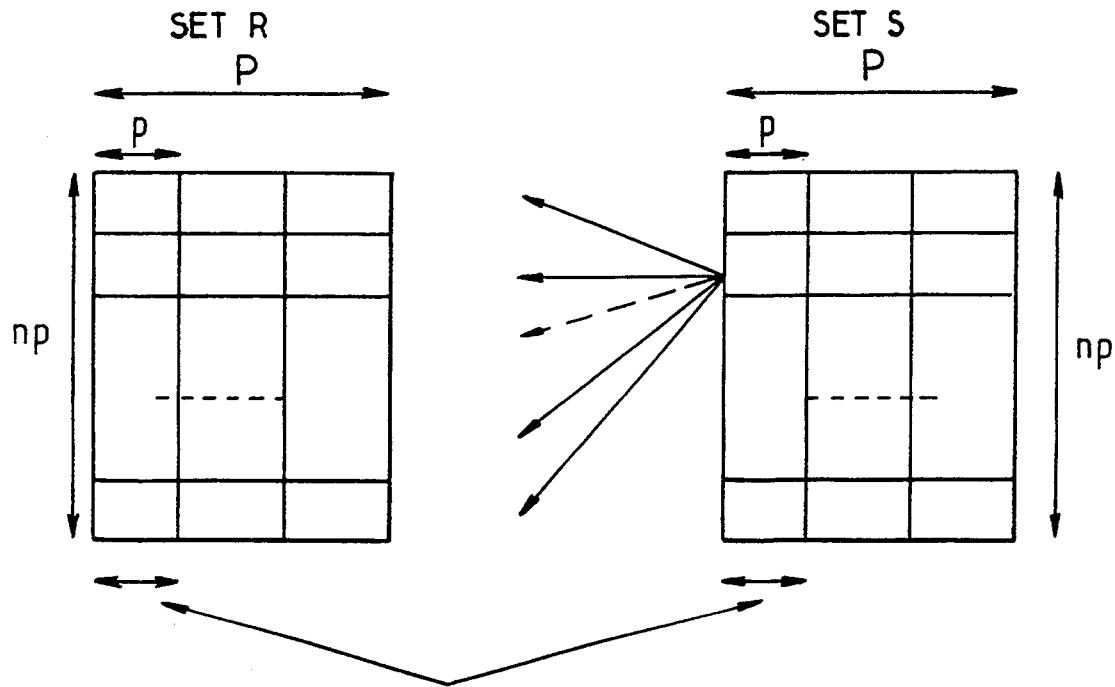
FIG. 5c is a diagram illustrating a generalization of the method of the invention to vectors having any dimension.
Figure 5D:
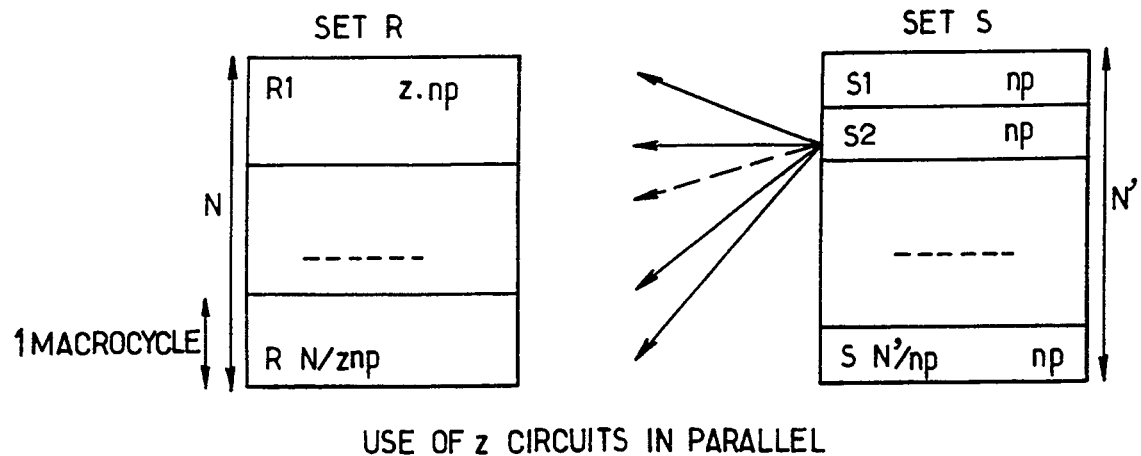
FIG. 5d is a generalization of the method of the invention using a plurality of two-dimensional networks, formed of operators, working in parallel.

As shown in FIG. 5d, the use of several parallel circuits makes it possible to increase the processing speed or, for the same speed, to process sets of greater size or cardinality.

The parallel use of z circuits allows the meeting of a set of n.q vectors of set S and a set of z.n.q vectors of set R to be processed during a macrocycle. For sets R and S of cardinality or size N, respectively N', the meeting of R and S results in the meeting of each sub-set of n.q vectors of S with all the sub-sets of z.n.q vectors of R. The number of macrocycles required for providing such meeting is consequently equal to:

$$\frac{N \cdot N'}{z \cdot (n \cdot q)^2}$$

It will be noted further that when z circuits are used in parallel, the processing time for causing the meeting of sets R and S is z times less than the time taken by a single circuit for carrying out the same operation.

Figure 5E:
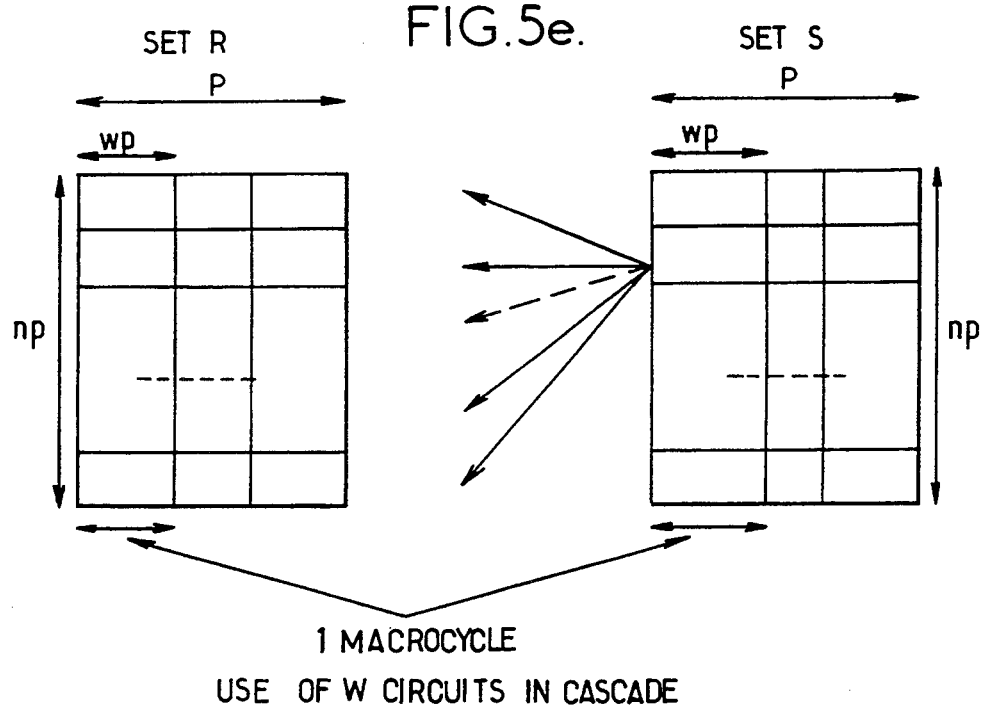
FIG. 5e is a generalization of the method of the invention using a plurality of two-dimensional networks, formed of operators, working in cascade.

As is shown in FIG. 5e, during the use of several operators in cascade, the cascading of several operators increases the dimension of the vectors thus processed. For vectors of sets R and S having a dimension P, w cascaded operators allow the meeting of n.q sub vectors of set R and n.q sub vectors of set S of dimension w.p to be processed during a macrocycle. The processing of the set of vectors requires a number of macrocycles equal to:

$$\frac{P}{w \cdot p}$$

By using w operators in cascade, the processing time which a single operator would take for carrying out the same operation can be divided by w.

A more detailed description of an advantageous embodiment of a circuit of the present invention, more especially designed for product-matrix-vector type processing, in particular a matrix A of dimension $N^2$ and vector X of dimension N, will be described in connection with FIG. 6a–6c.

In said embodiment, such as shown in FIG. 6a and 6b, the active processing unit 3 may be formed of a network of processing cells comprising a single column with n processing cells forming an operator referenced O. Thus, the two-dimensional network in the embodiment such as shown in FIGS. 6a and 6b is reduced to a monodimensional network, one of the dimensions of the two-dimensional network having a zero measurement.

As can be seen from FIG. 6b, each processing cell CT comprises a multiplier 100 and adder 101. The components xj of vector X are introduced sequentially from the working memory plane 20 and the coefficients aij, with i, j belonging to 1,n, of matrix A are loaded into the phantom plane 11 or the working plane 10 of the storage unit 1.

The components X1, X2, Xj, Xn of vectors X are introduced into operator 0 via a common bus referenced BUS which serves successively the processing cells CT. Said components are preferably stored in registers playing the role of working memory plane 20 as described above.

Matrix A is stored in the working memory plane 10 of the storage unit 1, each processing cell CT being capable of receiving simultaneously a component A1j of the first vector line of matrix A. Thus, at time T1, cell 31 receives the components x1 and a11, at time T2 cell 32 receives the components x2 and a12 and so on. At time Tk the cell 3k receives the components xk and a1k. It works out the product a1k.xk and adds it to the partial sum Sk-1 delivered by the processing cell CT 3k-1. At time T k+1, the processing cell CT of order k delivers the partial sum Sk which is expressed by:

$$Sk = \sum_{j+1}^{k} aij \cdot xj$$

At time Tn+1, the operator O delivers the first component y1 of the result vector Y.

Furthermore, at time T2, cell 31 may receive the first component of the second vector line a21, at time T3 cell 32 receives the component a22 and so on. At time Tn+2, the operator O delivers the second component y2 of the result vector Y. The procedure is repeated thus on all the line vectors of matrix A such as shown in FIG. 6 and operator O delivers sequentially the n components of the result vector Y.

When the n components of vector X have been loaded into operator O, in particular into the registers 102 of the corresponding processing cells CT, the operator is ready to accept the components of a new vector X' and consequently a new vector X may be processed every n clock cycles.

As is shown in FIG. 6c, the microcycle is here defined as being the period which corresponds to the computation of the product between matrix A and a vector X, this microcycle being equal to n clock cycles. At the end of a microcycle, the context permitting the processing of a new vector is thus ready.

Similarly, the macrocycle is then defined as being the period required for loading a new matrix A' into the phantom memory plane 11 at the rate of one coefficient per clock cycle, the loading time being proportional to $n^2$. Concurrently with such loading, n microcycles may thus be carried out.

Two more specific variants relative respectively to operations of square matrix $\mathcal{A}$ of dimension $N^2$, dimension, and vector X of dimension N then rectangular matrix $\mathcal{A}'$ of dimension N.M, vectors $\mathcal{X}'$ dimension M product type will be described in connection with FIGS. 7a and 7b.

Figure 7A:
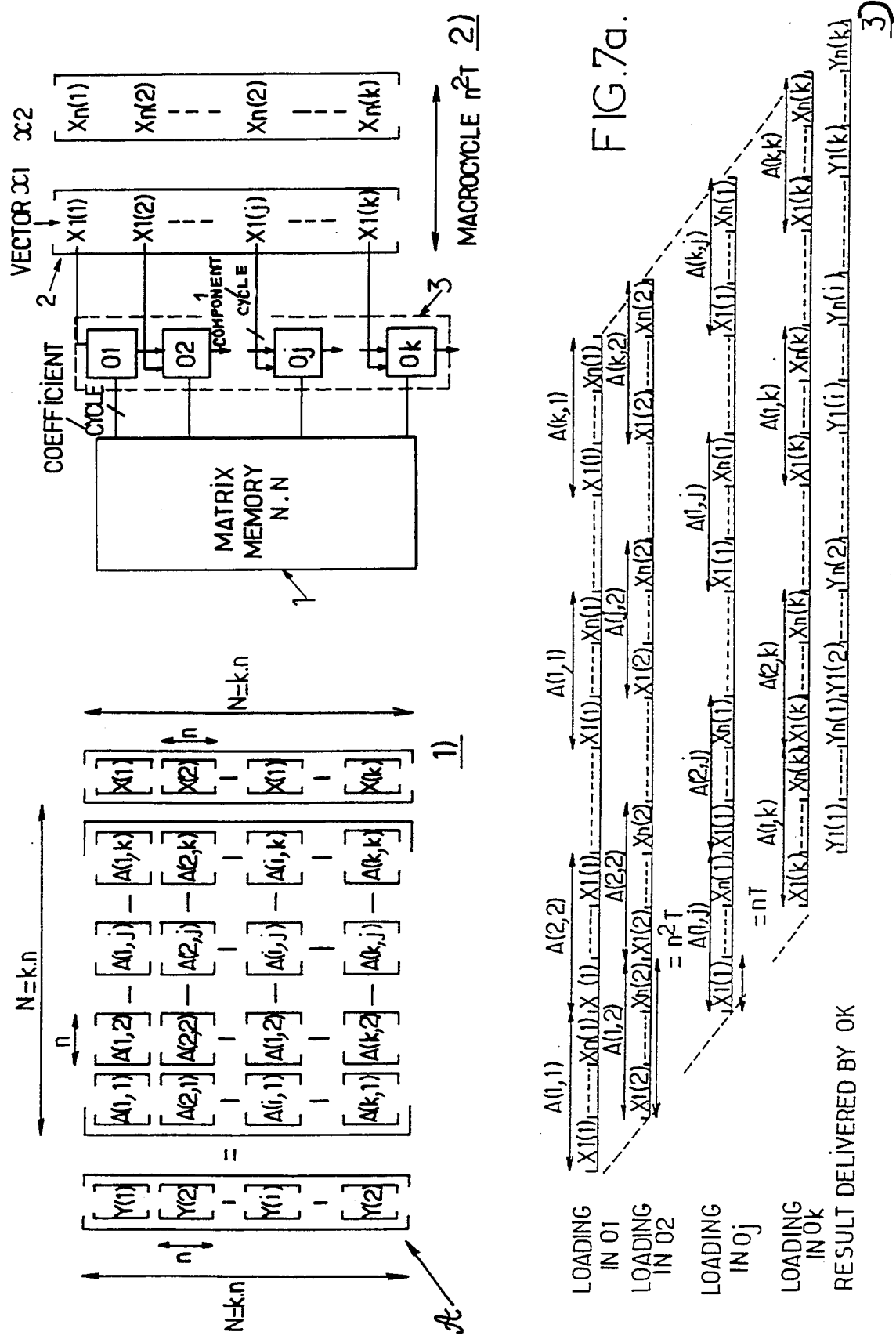
FIG. 7a is relative to another particular embodiment of the circuit according to the invention more particularly intended for processing of matrix-vector product type in the case of a square matrix of very large size.

In FIG. 7a, at point 1) $\mathcal{A}$ is a square matrix of dimension $N^2$ and $\mathcal{Y}$ and $\mathcal{X}$ designate vectors of dimension N, N being very large compared with n.

The calculation of the product $\mathcal{Y} = \mathcal{A} \cdot \mathcal{X}$ is based on the procedure already described relatively to FIG. 6. It is considered that N is a multiple of n with N=K.n.

In such a case, the active processing unit 3 comprises K cascaded operators working in parallel. The operators in said figure at point 2) are referenced respectively O1 to OK.

The vector $\mathcal{X}$ is broken down into its components in K equal parts of sub vectors of dimension n, these sub vectors being referenced X(1), X(2), ... X(j), X(k).

Similarly, the matrix $\mathcal{A}$ is then broken down into $K^2$ sub matrices of size $n^2$, each referenced A(i,j) with i,j belonging to [1,k].

The result vector $\mathcal{Y}$ of the product is obtained in that form:

$$\mathcal{Y} = \begin{bmatrix} [Y(1)] \\ [Y(i)] \\ [Y(K)] \end{bmatrix} \text{ with } Y(i) = \sum_{j=1}^{K} A(i,j) \cdot X(j)$$

In said relation, the term A(i,j).X(j) designates the product of the sub matrix A(i,j) of dimension $n^2$ and of the vector X(j) of dimension n. It will be noted that Y(i) designates the $i^{th}$ part or sub vector of dimension n of the result vector $\mathcal{Y}$.

The organization of the computations rests on a succession of macrocycles of $n^2$ cycles.

During each macrocycle, a row of K matrices A(i,j) j=1, ..., K is processed and, in parallel, the following row of the K matrices A(i+1,j) is loaded into the free memory planes of the K operators. K macrocycles are therefore required for processing the K matrix rows of the matrix $\mathcal{A}$.

A macrocycle, on the other hand, is broken down into n microcycles. A microcycle corresponds to the product of a vector $\mathcal{X}$ with the n line vectors of $\mathcal{A}$ which form the K matrices A(i,j) for j=1, ..., K. The result of this product is the vector Y(i), the $i^{th}$ part of $\mathcal{Y}$. The n successive microcycles of a macrocycle correspond consequently to the successive processing of n vectors $\mathcal{X}$, referenced $\mathcal{X}1, \mathcal{X}2, ..., \mathcal{X}n$. The successive results delivered are the vectors $\mathcal{Y}1(i), \mathcal{Y}2(i), ..., \mathcal{Y}n(i)$, the $i^{th}$ parts of the result vectors $\mathcal{Y}1, \mathcal{Y}2, ..., \mathcal{Y}n$.

The progression of the computations is illustrated by the timing diagram of FIG. 7a, point 3.

Initially, the matrices A(1,1), A(1,2), ..., A(1,j), ..., A(1,K) are considered as respectively loaded in the memory planes of the operators O1, O2, ..., Oj, ..., OK.

The coordinates of the vector X1 are loaded sequentially in the operators in the following way:

| | |
|---|---|
| From T1 to Tn: | O1 receives the n components of the vector X1(1) |
| From Tn + 1 to T2n: | O2 receives the n components of the vector X1(2), |
| From T(k − 1)n + 1 to TN: | OK receives the components of the vector X1(K) |

From TN+1 to TN+2, the last operator delivers the n components of the vector Yi(1).

Concurrently with loading of the vector X1(2) into the operator O2, O1 may receive the n components of the vector X2(1). The loading of vector X2 consequently takes place in the same way as for X1, but with a shift of n cycles. The same goes for the vectors X3, ..., Xn. The results delivered by the last operator of the chain are consequently successively the vectors Y1(1), ..., Yn(1).

In each operator the matrix loaded into the first memory plane is used for a macrocycle of $n^2$ cycles. During the processing of the matrices A(i,j), j=1, ..., K, the matrices A(2,j), j=1,...,K are loaded into the operators. When the loading is finished, which corresponds to the end of the first macrocycle, the second macrocycle starts and the vectors $\mathcal{X}1, \mathcal{X}2, ..., \mathcal{X}$ n are again introduced sequentially into the operators.

The results delivered during the second macrocycle are the vectors Y1(2), Y2(2), Y3(2), ..., Yn(2).

The results delivered during the last macrocycle are the vectors Y1(k), Y2(k), ..., Yn(k).

K macrocycles are required for the overall processing of the matrix during which the products $\mathcal{A} \cdot \mathcal{X}1, \mathcal{A} \cdot \mathcal{X}2, ..., \mathcal{A} \cdot \mathcal{X}n$ are worked out.

Figure 7B:
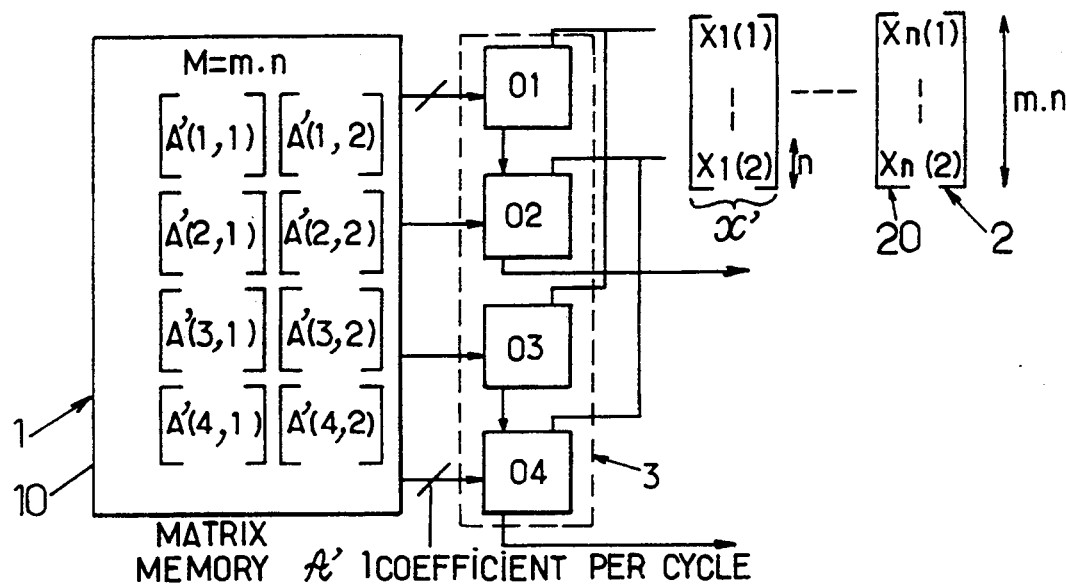
FIG. 7b is relative to another particular embodiment of the circuit according to the invention more particularly intended for processing of the matrix-vector product type in the case of a rectangular matrix comprising at least one large dimension.

In the embodiment such as shown in FIG. 7b, it is designed to provide processing of the vector matrix product type, matrix $\mathcal{A}$ of dimension N.M and vector $\mathcal{X}'$ of dimension M.

In this case, the active processing unit 3 comprises K operators in cascade working in parallel, the vector $\mathcal{X}'$ being divided into m parts or sub vectors of dimension n, referenced $\mathcal{X}'(1), \mathcal{X}'(2), ..., \mathcal{X}'(n)$, the matrix $\mathcal{A}'$ being broken down into K.m matrices of dimension $n^2$ referenced A(i,j) with i belonging to [1,K] and j belonging to [1,m].

Thus, for processing in the embodiment of FIG. 7b, K/m groups are formed of m operators each, the groups of operators O1 to OK working independently in parallel.

During the first macrocycle, the first group processes the elementary matrices A(1,1), A(1,2), ..., A(1,m). The second group processes the matrices A(2,1), A(2,2), ..., A(2,m). The last group of the K operators processes the matrices A(K/m,1), A(K/m,2), ..., A(K/m,m).

During this macrocycle, n vectors $\mathcal{X}'$ are processed and the results delivered by the first group are successively Y1(1), ..., Yn(1), the results delivered by the second group are the vectors Y1(2), ..., Yn(2) and the last group delivers the vectors Y1(K/m), ..., Yn(K/m). During the first macrocycle, K new matrices may be loaded into the operators, these new matrices being processed during the second macrocycle.

This computation thus requires a succession of m macrocycles during which n vectors $X'$ are processed with the whole of the matrix $\mathcal{N}'$.

A detailed description of a particularly advantageous embodiment of a circuit of the present invention more particularly intended for implementing a procedure of comparison of two relations of a data base will be given in connection with FIGS. 8a, 8b, 8c.

It will first of all be recalled that a data base is nothing but a set of relations, for example: pupil, teacher, lessons, that a relation is formed of a set of tuples, for example the different pupils and finally a tuple is formed of different attributes. For example, for a pupil tuple, his surname, his Christian name, his age, his address, his option etc.

Most of the questions, formulated by tests, on a data base may be broken down into a succession of elementary operations relating to one or two relations, i.e. to one or two sets of tuples.

Conventionally, these operations are:
the selection, i.e. the choice on a criterion,
joining, i.e. the detection of an attribute or a function of attributes over four tuples,
the operations relative to sets, such as the union, the intersection and the difference of sets,
the projection, the projection on some attributes or suppression of doublets,
and finally sorting.

All these operations, except selection, take place by comparison of all the elements of one set with all the other elements of the other set. Generally, we speak of the comparison of two sets. Depending on the question posed, the analysis of the results of the comparisons differs.

The size of the relations in a data base may vary from a few tens to a few million tuples. The operation of comparison between two sets is therefore an extremely expensive operation, particularly in time, and it will be noted that to compare two sets of one thousand elements by a direct method, it is necessary to provide a million comparisons.

At the present time, there exist three types of algorithms for comparing two sets: directly by sorting and by chopping.

The essential part of the chopping method is to apply the same random function to the value of the attributes of each tuple, so as to obtain partitioning of the tuples into different disjointed sub-sets, these sub-sets being indexed by the values of the chopping function. Thus, between two packets of different indices, there exist no jointing tuples. After the chopping phase, it only remains to join the packets having the same index.

This latter method reduces the number of comparisons and divides an operation into several smaller independent operations.

It will be noted that the circuit of the present invention has an architecture particularly well adapted to the chopping method. In fact, this method makes it possible to transform the comparison of two sets of great cardinality into a succession of comparisons of sets having a smaller cardinality particularly between 30 and 100 elements An elementary comparison may thus be made directly by an elementary processor PE, for example while the context of the next operation is loaded.

Figure 8A:
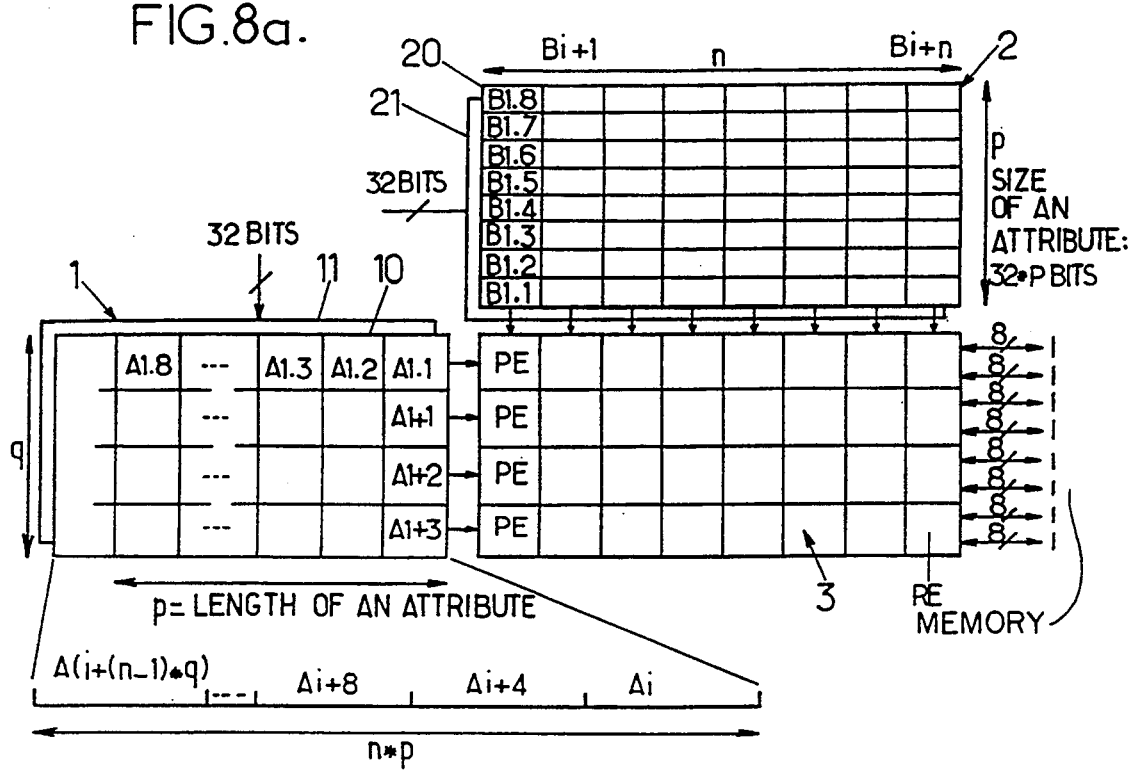
FIG. 8a represents another particular embodiment of the circuit of the present invention more particularly intended for processing multi-attribute tuples of a data base.
Figure 8B:
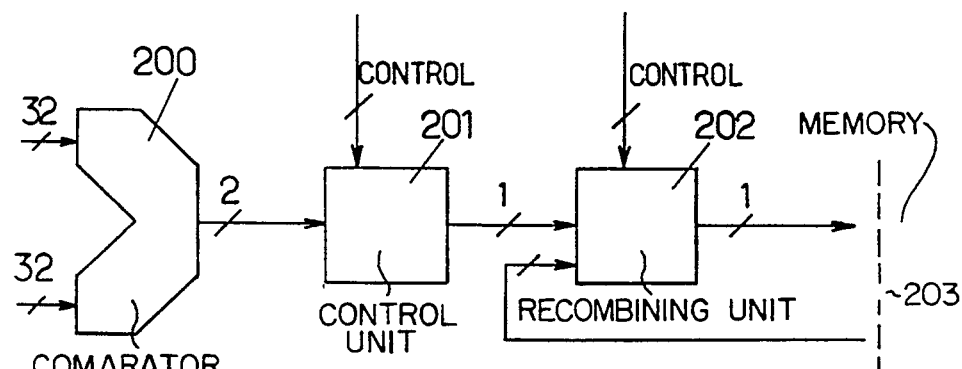

In the embodiment such as shown in FIGS. 8a and 8b, it will be noted that this embodiment corresponds to an architecture in accordance with the second configuration such as shown in FIG. 4, called configuration of parallel presentation-parallel distribution type. This embodiment does not prejudge the chosen configuration, any other configuration of sequential presentation (i.e. introduction)-parallel distribution type being of course possible, without departing from the scope of the present invention.

As can be seen from FIG. 8b, each elementary processor PE of the two-dimensional network RE comprises a digital comparator 200 for answering the questions or tests "R.A"="S.A", where "R.A"<"S.A" where "R.A" and "S.A" are either attributes or attribute parts. A programmable control unit 201 makes it possible to answer one of the following tests: "R.A"<"S.A", "R.A"=<"S.A", "R.A"="S.A", "R.A">="S.A" or "R.A">"S.A". The programmable control unit 201 delivers a result bit of value 1 on a positive response to the test considered and a result bit of value 0 in the opposite case. Finally, a programmable unit 202 re-combines the result bit delivered by the programmable control unit 201, for the test considered, with a prior intermediate result bit. Finally, a memory 203 is provided for storing either the intermediate results delivered by each elementary processor PE or the results defined as has already been mentioned in the description, this memory 203 being for example implanted similarly to memory 5 in the circuit of the present invention, such as shown in FIGS. 3 and 4.

It will be noted that all the elementary processors PE of an active processing unit 3 forming the two-dimensional network RE of FIG. 8a obey the same control and are therefore implanted in an SIMD type configuration, i.e. with single processor control, which makes the control part of the active processing unit 3 and of each elementary processor PE extremely simple.

Such elementary processors PE, because of their relative simplicity, comprise very few transistors, from a thousand to two thousand, depending on the desired operating frequency, which makes it possible to implant several tens of such elementary processors per active processing unit 3 and so for each circuit.

The comparison of two sets of attributes will now be described in connection with FIGS. 8a 8b and 8c.

Generally, whatever the operation carried out on two relations, the meeting of a tuple of R and a tuple of S may be expressed in the following way:
(R.A1 OP1 S.A1) and/or (R.A2 OP2 S.A2) and/or ...
(R.A OPk S.Ak),
where
R.Ai is the $i^{th}$ attribute of a tuple of R, S.Aj is the $j^{th}$ attribute of a tuple of S, k is the number of attributes that the operation uses, OPj is an operator of the type F,<,>,J,=,≠.

The operation carried out between two attributes is arithmetical, but its result is Boolean. In other words, it consists in replying to a question of the type: Is the attribute i of the tuple R greater than the attribute j of tuple S? If such is the case, the response is 1, if not it is 0.

The result of a meeting of two tuples is the Boolean value of a Boolean function applied to the set of results obtained over the pairs of attributes. An operation on two relations consists in applying this operation to all the possible pairs of tuples formed of one tuple of R and one tuple of S. In other words, any tuple of S must meet all the tuples of R.

In a data base relation, the tuples are formed of a given number of attributes. However, an operation carried out on two relations does not necessarily use all the attributes of the tuples. For example, let us consider a jointing operation carried out over two relations R and S and which consists in searching for all the pairs of tuples of R and S which verify the Boolean expression:

[R.A1<S.A3 and R.A3=S A4]=true.

In the example given here, only the attributes 1 and 3 of the tuples of R and the attributes 3 and 4 of the tuples of S are used in the operation. The others are not considered.

It should further be noted that the size of an attribute (number of bits) may be very high. We will consider subsequently that the elementary processor PE is capable of effecting the meeting of two words of 32 bits for example.

When the length of the attribute exceeds 32 bits, which is generally the case, it may be divided into several words of 32 bits, and the words processed separately.

This chopping up raises no problem. In fact, for attributes formed of p words of 32 bits, a question of the type R.Ai=S.Bi may be broken down into a Boolean function of the results obtained on each of the words of 32 bits:

R.Ai1=S.Bi1 and R.Ai2=S.Bi2 and ... and R.Aip=S.Bip where Aij designates the $j^{th}$ word of the attribute i.

We will consider an operation using a single attribute per tuple. The question or test posed for each pair of tuples formed is of the type R.Ai=S.Bj.

By way of non limitative example, we will consider:
A size of attribute equal to 32.p bits,
A sub-set size of n.q attributes, namely n.q tuples (1 attribute/tuple),
A microcycle of np clock cycles,
A macrocycle of npq clock cycles, i.e. q microcycles.

The depth of the memory plane of the storage unit 2 relative to set S is considered equal to p words of 32 bits, thus making it possible to store an attribute in each column.

A microcycle is divided into n phases of p clock cycles. In a phase of p cycles, the meeting of n tuples of S and q tuples of R is effected. The attributes A and B are broken down into p words of 32 bits A1, A2, ..., Ap and B1, B2, ..., Bp. The question A=B then becomes "A1=B1" and "A2=B2" and ... and "Ap=Bp". It is then sufficient during these p cycles to carry out a logic "AND" between all these partial results so as to obtain the response to "A=B". These "AND"s are effected naturally by recurrence by programming a re-combination unit such as shown in FIG. 8c. Once the phase of p cycles has elapsed, the results are sent to the outside for processing by the data base management system.

The meeting of the two sub-sets of nq tuples here lasts for a macrocycle.

One of the great advantages of the architecture of the circuit of the present invention such as shown in FIGS. 8a and 8b is that it is possible to process:
tuples of any dimension, if an operation uses k attributes of a tuple, k macrocycles will be required,
attributes of any length. In fact if the attributes are longer than 32.p bits, it is then sufficient to divide each attribute into m packets of 32.p bits. The comparison of two sets of attributes will then last m macrocycles.

In both cases, the partial results obtained at each macrocycle must be re-injected by programming the recombination unit appropriately.

This point is extremely important since it gives the circuit a flexibility indispensable in a data base context.

The architecture proposed such as shown in FIGS. 8a, 8b makes it possible in particular to compare two sets of n elements with a memory size integrated in the circuit of the present invention equal to $2n+2\sqrt{n}$.

In a conventional integrated memory solution, the size of the memory is only 2 n. The need of an additional storage cost in the circuit of the present invention can then be seen, but this additional cost allows the comparison and loading of the elements of the following comparison to be executed in parallel. There is then finally a gain of two in the processing rate, for the same technology, with respect to the conventional solution. In fact, in a conventional solution, the operation for comparing two sets takes place in two steps: loading of the two sets to be compared then the comparison properly speaking.

An application of the circuit of the present invention to a system for processing digital signals representative of vectors or tuples of a data base will be described in connection with FIG. 9.

Such a system results from an advantageous character of the circuit of the present invention according to which it is possible to connect several circuits in cascade, without difficulty, when the processing of sets of vectors, or tuples, of greater size is envisaged. In such a case, the number of read-outs from memory remains always minimum. Assuming that a circuit of the present invention is able to process sets of size n, for processing a set of size 2 n for example, it is sufficient in fact to associate two circuits in cascade. More generally, the system then comprises a plurality of circuits referenced C1 to Ck connected in parallel, these circuits operating however in cascade as will be explained hereafter. Each circuit receives respectively at the level of these working memory planes 10 and phantom planes 11 a partitioning R'1, R'2, R'k of the set R of the spatial meeting data vectors, whereas the working memory planes and phantom planes 20, 21 receive in parallel the input data vectors S, which increases the cardinality of the sets of spatial meeting data tuples processed without modification of the bit rate for the same processing time. It will of course be noted that the cardinality of the sets of spatial meeting data tuples is equal to the sum of the cardinalities of each of the partitions R'1 to R'k.

Such an operating mode may be generalized to any sizes of sets, provided that a number of required corresponding circuits are placed in cascade, as shown in FIG. 9.

It should be noted that in a conventional integrated memory solution, the performances would drop inacceptably for it would be necessary to read out several times the elements from one of the sets into the main memory.

A method and a circuit have thus been described for processing digital data representative of vectors or tuples, which perform particularly well to the extent that the particular arrangement of this type of circuit, because of the use of the processing method of the invention, makes it possible to implant CMOS 1.2 micron technology circuits able to process sizes of packets of 32 tuples with attribute sizes of 4×32 bits or packets of 64 tuples with attribute sizes of 2×32 bits with a clock cycle time of 80 ns.

By way of comparison, the performances of the circuit of the present invention will be given compared with those of different processors already existing.

If we assume a jointing over two sets of a thousand elements of 4 bytes a processor of type VAX 750/11 having a processing rate of 8 Mips effects such jointing in 1.1 seconds. For a power processor of 20 Mips a processing time of 0.44 seconds is required for a comparable operation. It will be noted that a co-processor of RAPID type is able to perform such an operation for a cycle time of 120 ms thus brought to 3.44 ms for an equivalent cycle time of 80 ns.

Contrary to the previously announced result, the circuit of the present invention in its architecture and computing arrangement requires an execution time for such an operation of 0.32 ms. It therefore provides a gain of about 100 with respect to a 20 Mips computing power processor and a gain of 10 with respect to a RAPID type co-processor. It will however be noted that these results are to be weighted because in the RAPID type processor and in the architecture proposed, account is not taken of the previously mentioned initial chopping phase. However, the addition of a circuit of the present invention to a 20 Mips computing power processor would improve the overall performances thereof during data base applications by a factor of 20.

What is claimed is:

1. A method of processing digital signals representative of vectors referred to as tuples having the same dimension p, said processing being carried out between pairs of vectors Xi with components {xki} of a first set of vectors R and of vectors Yi with components {yki} of a second set of vectors S, said processing comprising in causing pairs of said vectors Xi, Yi to meet so as to bring together components of the same order k{xki}; {yki} and effecting computation on said components, said method comprising the steps of:

designating one of the sets of vectors R as spatial meeting data, corresponding to a succession in time of spatial meeting data vectors Rk formed by the vectors Xi;

designating the other set of vectors S as input data, said input data being formed from at least one vector Yi of said other set of vectors S; and meeting in space and in time of said input data and spatial meeting data using parallel processing, said parallel processing being organized as a two-dimensional network of cells for processing said components {xki} and {yki} of same order k, one of the dimensions of said two-dimensional network referred to as the x dimension being assigned to said succession in time of spatial meeting data vectors Rk and the other dimension of said two-dimensional network referred to as the y dimension being assigned to the input data formed by at least said vector Yi so as to perform a spatial parallelism processing in which an input data vector meets in parallel a plurality of spatial meeting data vectors and a time parallelism processing in which a plurality of input data vectors are processed in parallel.

2. The method as claimed in claim 1, wherein each spatial meeting data vector Rk is formed by a vector Xi of dimension p, said dimension (x) of said two-dimensional network of processing cells having assigned thereto the components {xki} forming said spatial meeting data vector Rk, said two-dimensional processing network comprising along said dimension (x) p processing cells.

3. The method as claimed in claim 2, wherein, with said two-dimensional network comprising n.p processing cells arranged in p lines and n columns, said meeting between two vectors Xi, Yi is conducted in a column of said processing cells, each processing cell delivering to the processing cell of immediately higher order in the same column an intermediate processing result, the processing cell of order p of each column delivering a final processing result for a given pair of vectors Xi, Yi.

4. The method as claimed in claim 1, wherein each spatial meeting data vector Rk is formed by an arrangement of the components {xki} of a plurality of q vectors Xi, i∈[1,q], the succession in time of spatial meeting data vectors Rk being formed by the corresponding components {xki} of the vectors Xi said two-dimensional processing network comprising q processing cells along said dimension (x).

5. The method as claimed in claim 4, wherein, with said two-dimensional network comprising n.q processing cells arranged in q lines and n columns, said meeting between two vectors Xi, Yi is conducted locally at the level of a processing cell, by processing the p corresponding components {xki}, {yki}.

6. The method as claimed in claim 1, wherein said input data is formed from n vectors Yi, i ∈[1,n], said other dimension y of said two-dimensional network of processing cells having assigned thereto the components {yki} forming an input data vector, said two-dimensional network of processing cells comprising n processing cells along said other dimension y.

7. The method as claimed in claim 1, wherein, in order to cause the meeting in space and time of two sets R, S of any cardinality in a sequential procedure, said meeting being performed through a two-dimensional network of cells having memory means comprising a working memory plane and a phantom memory plane associated with each of said one and other dimension of said network respectively, said working memory plane being directly interconnected to cells of said two-dimensional network, said method further comprises:

separately storing said sets R and S;

storing a partition Rv, Su of said sets R and S, Rv and Su being sub-sets having the same cardinality;

storing said partition Rv in said working plane associated with said one dimension and a sub-set Sub of Su and sub-set of order 2 of S in said working memory plane associated with said other dimension;

meeting in space and in time of said sub-sets Rv and Sub, said step being referred to as, and run during, a microcycle;

simultaneously storing during said microcycle the sub-set Sub+1 of subsequent higher rank in said phantom memory plane associated with said other dimension;

repeating all previous steps for all of the sub-sets of order 2 Sub of S, and simultaneously storing of the partition Rv+1 of subsequent higher rank in said phantom memory plane associated with said one dimension, said step being referred to as, and run during, a macrocycle;

repeating all previous steps for all the sub-sets of S in a succession of macrocycles; and repeating all previous steps for all the sub-sets Rv of set R, which ensures the meeting of all the vectors of sets R, S.

8. The method as claimed in claim 1, wherein said components of said vectors Xi are arranged in columns.

9. The method as claimed in claim 1, wherein said components of said vectors Xi are arranged in rows.

10. A method of processing digital signals representative of vectors referred to as tuples of varying dimensions, said processing being carried out between pairs of vectors Xi with components {xki} of a first set of vectors R and of vectors Yi with components {yki} of a second set of vectors S, said processing comprising causing pairs of said vectors Xi, Yi to meet so as to bring together components of the same order k{xki}; {yki} and effecting computation on said components, said method comprising the steps of:

partitioning said sets of vectors into partition vectors of dimension p;

completing any partition vector having a dimension less than p with components of arbitrary value;

designating said first set of vectors as spatial meeting data, corresponding to a succession in time of spatial meeting data vectors rk formed by the partition vectors of said first set;

designating said second set of vectors as input data, said input data being formed from at least one partition vector of said second set of vectors; and meeting in space and in time of said input data and spatial meeting data using parallel processing, said parallel processing being organized as a two-dimensional network of cells for processing said components {xki} and {yki} of same order k, one of the dimensions of said two-dimensional network referred to as the x dimension being assigned to said succession in time of spatial meeting data vectors Rk and the other dimension of said two-dimensional network referred to as the y dimension being assigned to the input data so as to perform a spatial parallelism processing in which an input data vector meets in parallel a plurality of spatial meeting data vectors and a time parallelism processing in which a plurality of input data vectors are processed in parallel.

11. A circuit for processing digital signals representative of vectors referred to as tuples of the same dimension p, the processing being carried out between pairs of vectors Xi with components {xki} of a first set of vectors R and vectors Yi with components {yki} of a second set of vectors S, said processing comprising causing pairs of vectors Xi, Yi to meet so as to bring together components of the same order k{xki}; {yki} and for carrying out a computation on said components, said circuit comprising:

first means for storing one of the sets of vectors R in the form of spatial meeting data, said stored spatial meeting data being able to be read as a succession in time of spatial meeting data vectors Rk formed by said vectors Xi;

second means for storing the other set of vectors S in the form of input data, said stored input data being formed from at least one vector Yi of said other set S of vectors;

computing means for receiving said spatial meeting data from said first storing means and said input data from said second storing means and for providing a meeting in space and time of the input data and the spatial meeting data using parallel processing, said computing means comprising as a two-dimensional network of cells for processing said components {xki} and {yki} of the same order, said succession in time of spatial meeting data vectors being assigned to one of the dimensions x of said two-dimensional network and the input data being assigned to the other dimension y of this network so as to perform a spatial parallelism processing in which an input data vector meets in parallel a plurality of spatial meeting data vectors and a time parallelism processing in which a plurality of input data vectors are processed in parallel.

12. The circuit as claimed in claim 11, wherein said two-dimensional network forming said computing means comprises a plurality of elementary processors forming the processing cells, said two-dimensional network being organized as a rectangular area for ensuring the meeting of a plurality of vectors of the first set R and of a plurality of vectors of the second set S.

13. The circuit as claimed in claim 11, wherein said first and second storing means each comprises:

a working memory plane in which a sub-set of corresponding vectors is stored during processing, said working memory plane being directly interconnected by a parallel interconnection to the processing cells of said two-dimensional network along the dimension to which said corresponding data is assigned; and a phantom memory plane interconnected to a mass memory and to said working memory plane respectively, said phantom memory plane acting as an auxiliary memory of the working memory plane for a sub-set of corresponding vectors of a higher order during the processing of said sub-set of corresponding vectors.

14. The circuit as claimed in claim 13, wherein said working memory plane in which a set of vectors of the other set of vectors S is stored is organized so as to store the components {yki} of said corresponding vectors Yi in memory cells using line and column addressing, each vector Yi being stored in a column and said working memory plane comprising n columns for storing n vectors Yi, each line comprising n components {yki} forming said input data.

15. The circuit as claimed in claim 14, wherein the number of storage cells Tr of the phantom memory plane or of the working memory plane relative to the set R verifies the relation:

$$Tr = \frac{\mathcal{N} \cdot p}{Ny}$$

in which $\mathcal{N}$ designates the number of elementary processors forming the two-dimensional network, p designates the dimension of the vectors, Ny designates the rate of storage, in said memory planes, of the number of components of the vectors per clock cycle.

16. The circuit as claimed in claim 14, wherein, in a first configuration of sequential presentation-parallel distribution type, said two-dimensional network comprises n.p elementary processors arranged in p lines and n columns, each memory cell of the first line of the working memory plane being interconnected to all the processing cells and to the corresponding elementary processor via a BUS, said working memory plane in which the spatial meeting data vectors are stored being organized so as to store the components {xki} of said corresponding vectors Xi in memory cells using line and column addressing, each vector Xi being stored in a column, a spatial meeting data vector corresponding to a vector Xi, each memory cell of the first column of the working memory plane being interconnected to all the processing cells and to the corresponding elementary processor via a BUS.

17. The circuit as claimed in claim 16, wherein said working memory plane comprises n.p storage cell columns for storing the n.p vectors Xi.

18. The circuit as claimed in claim 16, wherein, in a second configuration of parallel presentation-parallel distribution type, said two-dimensional network comprises n.q elementary processors arranged in q lines and n columns, said working memory plane in which the spatial meeting data vectors are stored being organized for storing the components {xki} of said corresponding vectors Xi in storage cells using line and column addressing, each vector Xi being stored in a line and each line comprising n vectors, each spatial meeting data vector being formed from components {xki} of the same order k of q vectors stored in q adjacent lines.

19. The circuit as claimed in claim 13, wherein, to achieve matrix-vector product type processing, matrix A of dimension $n^2$ and vector X of dimension n, said computing means are formed of a network of processing cells comprising a single column with n processing cells forming an operator, each processing cell comprising a multiplier and an adder, the components xj with j$\epsilon$[1,n] of said vectors X being introduced sequentially and the coefficients aij with i,j$\epsilon$[1,n] of matrix A being loaded into the phantom memory plane respectively the working memory plane of said storage means.

20. The circuit as claimed in claim 19, wherein, for matrix-vector product type processing with matrix $\mathcal{A}$ of dimension $N^2$ and vector $\mathcal{X}$ of dimension N, with N>>n and N=K.n, said computing means comprise K operators in cascade working in parallel, said vector $\mathcal{X}$ being broken down into its components into K equal parts of dimension n, referenced X(1), X(2), . . . , X(j), . . . , X(K), said matrix being broken down into $K^2$ sub-matrices A(i,j) of dimension $n^2$ with i,j [1,K], the result vector of the product referenced $\mathcal{Y}$ being obtained in the form:

$$\mathcal{Y}(i) = \sum_{j=1}^{K} A(i,j) \cdot X(j)$$

where A(i,j).X(j) designates the product of the sub-matrix A(i,j) of dimension $n^2$ and of the vector X(j) of dimension n.$\mathcal{Y}$(i) designating the first part of the result vector $\mathcal{Y}$.

21. The circuit as claimed in claim 19, wherein for matrix-vector product type processing, with matrix $\mathcal{A}'$ of dimension N.M with N=K.n and M=m.n and vector $\mathcal{X}'$ of dimension M, said computing means comprise K operators in cascade working in parallel said vector $\mathcal{X}'$ being divided into m parts or sub vectors of dimension n referenced $\mathcal{X}'$(1), $\mathcal{X}'$(2), . . . , $\mathcal{X}'$(m) and the matrix $\mathcal{A}'$ being broken down into K.m matrices of dimension $n^2$ referenced A'(i,j) with i$\epsilon$[1,K] and j$\epsilon$[1,m].

22. A circuit for comparing relations in a data base, each relation being formed by a set of tuples each having a plurality of attributes, the comparison being carried out between pairs of attributes R.A of a first set of tuples R and attributes S.A of a second set of tuples S, said processing comprising causing pairs of attributes R.A, S.A to meet so as to bring together components of the same order {R.Ai}; {S.Ai} and for comparing said components, said circuit comprising:
  means for chopping said sets of tuples into sets of partition tuples having a number of attributes p;
  first means for storing said first set of partition tuples in the form of spatial meeting data, said stored spatial meeting data being able to be read as a succession in time of spatial meeting data tuples Rk formed by said attributes R.A;
  second means for storing said second set of partition tuples in the form of input data, said input data being formed from at least one attribute S.A of said second set S of tuples; and
  computing means, receiving said spatial meeting data from said first storing means and said input data from said second storing means, for providing a meeting in space and time of the input data and the spatial meeting data using parallel processing, said computing means being formed as a two-dimensional network of cells for processing said components {R.Ai} and {S.Ai} of the same order, said succession in time of spatial meeting data vectors being assigned to one of the dimensions x of said two-dimensional network and the input data being assigned to the other dimension y of this network so as to perform a spatial parallelism processing in which an input data attribute meets in parallel several spatial meeting data tuples and a time parallelism processing in which several input data attributes are processed in parallel, each processing cell forming the computing means, in order to carry out an elementary comparison, being formed by an elementary processor comprising:
    a digital comparator for responding to the test R.A=S.A, R.S<S.A, where R.A and S.A are either attributes or parts of attributes,
    a programmable control unit which responds to one of the following tests R.A<S.A, R.A=<S.A, R.A=S.A, R.A.>=S.A, or R.A>S.A, said programmable control unit delivering a result bit of value 1 on a positive response to the test considered and a result bit of value 0 in the opposite case, and
    a programmable unit for re-combining said result bit delivered by said programmable control unit for the test considered with a prior intermediate result bit.

23. A system for processing digital signals representative of vectors referred to as tuples of the same dimension p of a data base, said system comprising a plurality of circuits connected in parallel, each circuit of said system carrying out processing between pairs of vectors Xi with components {xki} of a first set of vectors R and vectors Yi with components {yki} of a second set of vectors S, said processing comprising causing said pairs of vectors Xi, Yi to meet so as to bring together components of the same order k{xki}; {yki} and for carrying out a computation on said components, each of said circuits comprising:
  first means for storing one of the set of vectors R in the form of spatial meeting data, said stored spatial meeting data being able to be read as a succession in time of spatial meeting data vectors Rk formed by said vectors Xi;
  second means for storing the other set of vectors S in the form of input data, said input data being formed from at least one vector Yi of said other set S of vectors;

computing means for receiving spatial meeting data from the first storing means and input data from said second storing means and for providing a meeting in space and time of the input data and the spatial meeting data using parallel processing, said computing means being formed as a two-dimensional network of cells for processing said components $\{xki\}$ and $\{yki\}$ of the same order, said succession in time of spatial meeting data vectors being assigned to one of the dimensions x of said two-dimensional network and the input data being assigned to the other dimension y of this network so as to perform a spatial parallelism processing in which an input data vector meets in parallel several spatial meeting data vectors and a time parallelism processing in which several input data vectors are processed in parallel; and said first and second storing means each comprising;
- a working memory plane in which a sub-set of corresponding vectors is stored during processing, said working memory plane being directly interconnected by a parallel interconnection to the processing cells of said two-dimensional network along the dimension to which said corresponding data is assigned, and
- a phantom memory plane interconnected to a mass memory and to said working memory plane respectively, said phantom memory plane acting as an auxiliary memory of the working memory plane for a sub-set of corresponding vectors of a higher order during the processing of said sub-set of corresponding vectors;

each circuit receiving respectively at its working memory plane and phantom memory plane of said first storing means a partition $R'1, R'2, \ldots, R'k$ of the set of spatial meeting data vectors, said working memory plane and phantom memory plane of said second storing means receiving in parallel the input data vectors, which increases the cardinality of the sets of spatial meeting data tuples processed without modifying the bit rate, for the same processing time.

* * * * *